United States Patent
Hyeon

(10) Patent No.: US 10,691,395 B2
(45) Date of Patent: Jun. 23, 2020

(54) DISPLAY APPARATUS AND CONTROL METHOD THEREOF

(71) Applicant: SAMSUNG ELECTRONICS CO., LTD., Suwon-si (KR)

(72) Inventor: Byeong Cheol Hyeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/214,748

(22) Filed: Dec. 10, 2018

(65) Prior Publication Data

US 2019/0179592 A1 Jun. 13, 2019

(30) Foreign Application Priority Data

Dec. 8, 2017 (KR) .................. 10-2017-0168209

(51) Int. Cl.
 *G06F 3/14* (2006.01)
 *G09G 3/00* (2006.01)
 *G09G 3/20* (2006.01)
 *G09F 9/302* (2006.01)

(52) U.S. Cl.
 CPC .......... *G06F 3/1446* (2013.01); *G09G 3/006* (2013.01); *G09F 9/3026* (2013.01); *G09G 3/2096* (2013.01); *G09G 2300/026* (2013.01); *G09G 2356/00* (2013.01); *G09G 2360/04* (2013.01); *G09G 2370/06* (2013.01)

(58) Field of Classification Search
 CPC .......... G09G 2300/026; G09G 2360/04; G06F 3/1446; G06F 3/1423; G06F 1/1626; G06F 11/325; G06F 1/1618; G06F 1/3203; G06F 1/3218; G06F 1/3265; G06F 1/3287; G06F 3/033; G09F 9/3026
See application file for complete search history.

(56) References Cited

U.S. PATENT DOCUMENTS

2008/0068199 A1 3/2008 Franz et al.
2011/0140993 A1 6/2011 Bess
(Continued)

FOREIGN PATENT DOCUMENTS

JP 2016-224517 A 12/2016
KR 2003-0020795 A 3/2003
(Continued)

OTHER PUBLICATIONS

International Search Report (PCT/ISA/210) dated Mar. 27, 2019 issued by the International Searching Authority in International Application No. PCT/KR2018/015639.

*Primary Examiner* — Sanjiv D. Patel
(74) *Attorney, Agent, or Firm* — Sughrue Mion, PLLC

(57) ABSTRACT

A display apparatus for position detection and separation of a plurality of display panels, and a control method thereof. A display apparatus includes a cabinet, a plurality of display panels disposed in a first direction of the cabinet, an indicator disposed in a second direction opposite to the first direction, a communicator configured to receive an external signal for detecting positions of the plurality of display panels, and a controller configured to control the indicator corresponding to the display panel which becomes a position detection target to be turned-on based on the external signal received by the communicator.

20 Claims, 22 Drawing Sheets

(56) References Cited

U.S. PATENT DOCUMENTS

| | | | |
|---|---|---|---|
| 2011/0255000 A1* | 10/2011 | Weber | G03B 17/02 |
| | | | 348/374 |
| 2014/0281758 A1 | 9/2014 | Klein et al. | |
| 2015/0194123 A1* | 7/2015 | Lee | G02B 3/0037 |
| | | | 345/1.3 |
| 2015/0279307 A1* | 10/2015 | Kinebuchi | G09G 5/003 |
| | | | 345/520 |
| 2016/0034240 A1* | 2/2016 | Kreiner | G06F 3/1446 |
| | | | 348/383 |
| 2016/0224306 A1* | 8/2016 | Rycyna, III | G09G 3/32 |
| 2017/0006727 A1* | 1/2017 | Ryu | H01L 25/0753 |

FOREIGN PATENT DOCUMENTS

| | | |
|---|---|---|
| KR | 10-2016-0062777 A | 6/2016 |
| KR | 10-2017-0000575 A | 1/2017 |

\* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2017-0168209, filed on Dec. 8, 2017, in the Korean Intellectual Property Office, the disclosure of which is incorporated by reference herein in its entirety.

BACKGROUND

1. Field

The disclosure relates to a display apparatus and a control method thereof, and more particularly, to a display apparatus which is provided to allow position detection and separation of a plurality of display panels, and a control method thereof.

2. Description of Related Art

A light-emitting diode (LED) display apparatus basically uses a small-sized LED panel to implement a large-sized screen. In such an LED display apparatus, a plurality of display modules in small units, as a module, are connected to each other to constitute a large-sized screen. Unlike an existing display apparatus, the LED display apparatus has an advantage in that a seam between modules is almost invisible to a user and thus a very large screen can be implemented.

Such an LED display apparatus is formed in units of modules. Therefore, an operator may desire to separate the modules from the apparatus in order to replace the module due to a defect occurring in the module or to adjust a position of the module.

SUMMARY

Provided is a display apparatus, which allows positions of display modules constituting the display apparatus or a plurality of display panels mounted on a display module to be detected and the display modules or the plurality of display panels to be easily separated, and a control method thereof.

In accordance with an aspect of the disclosure a display apparatus is provided, which allows position detection of a target display panel when an operation of separating a display panel from the display apparatus is performed, and a control method thereof.

Additional aspects will be set forth in part in the description which follows and, in part, will be apparent from the description, or may be learned by practice of the presented embodiments.

In accordance with one aspect of the disclosure, a display apparatus includes a cabinet, a plurality of display panels disposed at one side of the cabinet, an indicator disposed at a side opposite to the one side, a communicator configured to receive an external signal for detecting positions of the plurality of display panels, and a controller configured to control the indicator corresponding to the display panel which becomes a position detection target to be turned on based on the external signal received by the communicator.

Further, the controller may display a preset image on the display panel which becomes the position detection target from among the plurality of display panels based on the external signal received by the communicator.

Further, the indicator may be disposed in the cabinet corresponding to rear surfaces of the plurality of display panels to identify the positions of the plurality of display panels.

Further, the indicator may be provided on a control board mounted on the cabinet.

Further, the communicator may receive, from a user terminal, a position detection command for at least one of the plurality of display panels, and the user terminal may be provided to provide a display screen image partitioned into a plurality of regions corresponding to installation positions of the plurality of display panels.

Further, the communicator may receive, from the user terminal, the position detection command for the display panel corresponding to at least one of the plurality of regions.

Further, the communicator may simultaneously or sequentially receive an external signal for detecting the positions of the plurality of display panels.

Further, the communicator may be a digital signal input port.

Further, the communicator may receive an external signal for determining at least one of the plurality of display panels, and the controller may control the indicator corresponding to the display panel which becomes the position detection target to remain turned-on based on the external signal received by the communicator.

Further, the communicator may receive an external signal for detecting an error for at least one of the plurality of display panels, and the controller may detect an error for the at least one display panel based on the external signal for detecting the error and control the indicator corresponding to the display panel in which the error is detected to be turned on.

Further, the display apparatus may further include a coupling device to mount the display panel to be detachable from the cabinet.

Further, the display apparatus may include a detection circuit formed around the coupling device, and the controller may control the display panel which becomes a detection target to display the preset image based on the detection signal generated in the detection circuit.

Further, the coupling device may include a first coupling member mounted on the display panel and a second coupling member mounted on the cabinet, the first coupling member and the second coupling member may be provided to be locked or released from each other by a magnetic force, and the detection circuit may be a pattern formed in a shape of winding around the first coupling member.

Further, the coupling device may be a plurality of coupling devices with respect to a single display, and a plurality of the detection circuits respectively formed around the coupling devices may be connected in series.

Further, when an auxiliary tool having a size and shape corresponding to a size and shape of the display panel and including a magnet at a position corresponding to a position of the coupling device, approaches a vicinity of the detection circuit, a detection signal may be generated from the detection circuit due to a change in magnetic flux in the vicinity of the detection circuit.

In accordance with another aspect of the disclosure, a control method of controlling a display apparatus includes receiving, by a communicator, an external signal for detecting positions of a plurality of display panels and turning on an indicator corresponding to the display panel which becomes a position detection target.

Further, the control method may further include displaying a preset image on the display panel which becomes a position detection target from among the plurality of display panels.

Further, the receiving of the external signal for detecting the positions of the plurality of display panels by the communicator may include receiving, by the communicator from a user terminal, a position detection command for at least one of the plurality of display panels.

Further, the user terminal may provide a display screen image partitioned into a plurality of regions corresponding to installation positions of the plurality of display panels, and the communicator may receive, from the user terminal, a position detection command for the display panel corresponding to the at least one of the plurality of regions.

Further, the receiving of the external signal for detecting the positions of the plurality of display panels by the communicator may include simultaneously or sequentially receiving, by the communicator, the external signal for detecting the positions of the plurality of display panels.

Further, the communicator may receive the external signal for determining at least one of the plurality of display panels, and a controller may control the indicator corresponding to the display panel which becomes the position detection target to remain turned-on based on the external signal received by the communicator.

Further, the communicator may receive an error detection command for the plurality of display panels, and the controller may detect an error for the plurality of display panels based on the external signal for detecting the error and control the indicator corresponding to the display panel in which the error is detected to be turned on.

Further, the display apparatus may further include a coupling device provided to mount the display panel to be detachable from the cabinet and include a detection circuit formed around the coupling device, and the control method may further include displaying the preset image on the display panel which becomes a detection target based on a detection signal generated in the detection circuit.

Further, the control method may further include generating a detection signal from the detection circuit due to a change in magnetic flux in the vicinity of the detection circuit when an auxiliary tool having a size and shape of the display panel and including a magnet at a position corresponding to a position of the coupling device, approaches a vicinity of the detection circuit.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
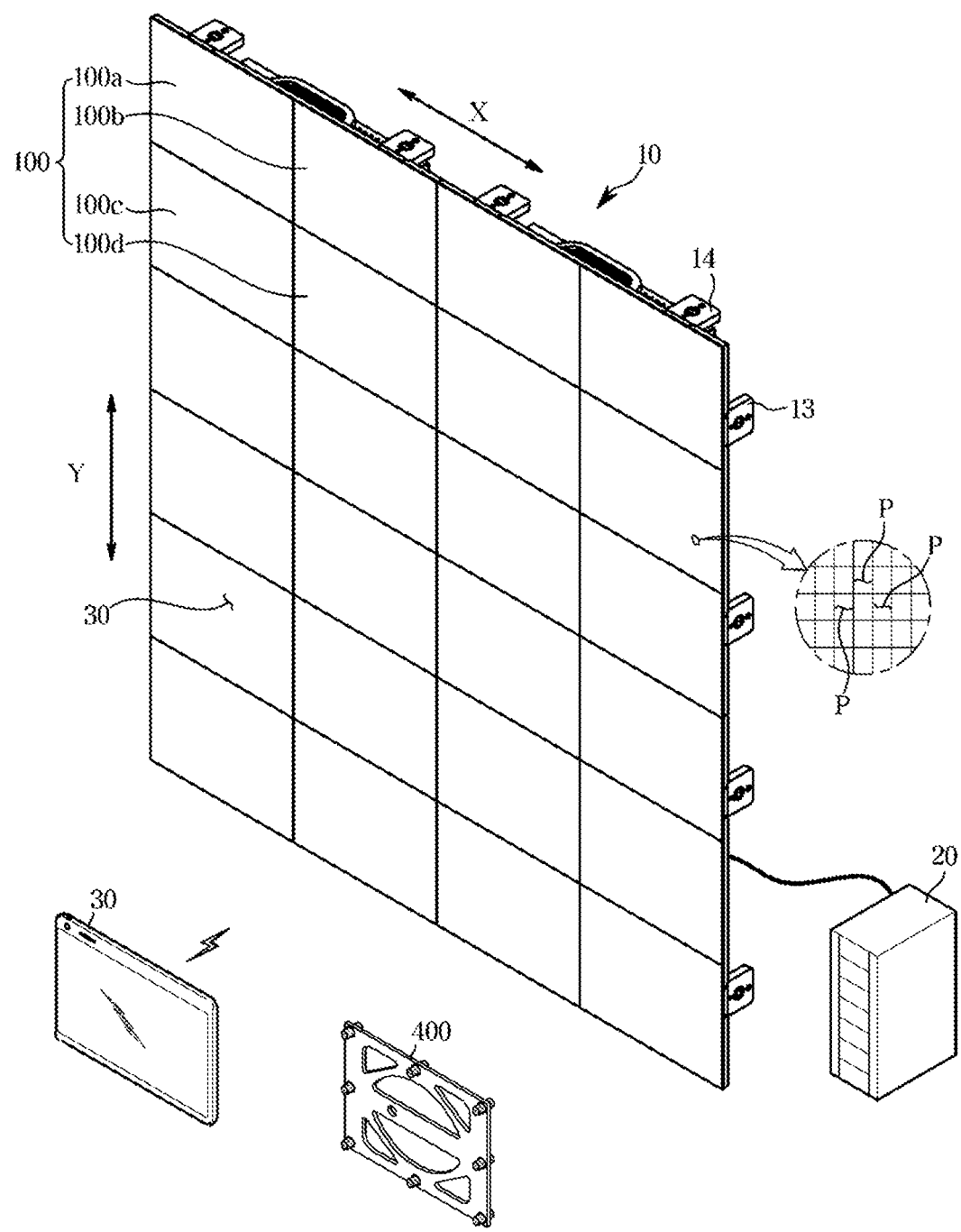
FIG. 1 is a view illustrating a display system according to an embodiment.

Like reference numerals refer to like elements throughout the specification. It is to be understood that not all elements of embodiments are described herein, and general contents or redundant contents of the embodiments in the art to which the present disclosure pertains will be omitted.

Terms used herein such as "unit," "module," "member," and "block" may be implemented by hardware or software. In some embodiments, a plurality of units, modules, members, or blocks may be implemented as one component, or a single unit, module, member, or block may include a plurality of components.

Throughout the specification, when a part is referred to as being "connected" to another part, it is understood that it includes not only indirect connection but also direct connection, and the indirect connection includes connection via a wireless communication network.

Further, when a part is referred to as "including," "having," "consist of," and the like another part, it is understood that it may further include other components, not excluding other components unless otherwise specifically indicated.

Throughout the specification, when a member is referred to as being positioned "on" another member, it is understood that it may include the case in which a member is between two other members as well as the case in which a member is in contact with another member.

Terms such as first, second, and the like are used to distinguish one element from another element, and the elements are not limited by the above-described terms.

Unless the context clearly indicates otherwise, the singular forms include the plural forms.

In each operation, identification codes are used for convenience of description and do not describe the order of the operations, and each operation may be performed differently from the stated order unless explicitly stated in the context.

Hereinafter, operation principles and embodiments of the present disclosure will be described with reference to the accompanying drawings.

The present disclosure relates to a display apparatus and a control method thereof, and more particularly, to a display apparatus, which is provided to allow a position of a display panel which becomes a replacement target (hereinafter, referred to as a target display panel) to be easily detected and the corresponding display panel to be easily separated when display panels are replaced, and a control method thereof. It is necessary to detect the position of the display panel in order to replace the display panel. Hereinafter, the display panel which becomes a position detection target is referred to as a target display panel. On the other hand, in some cases, the display panel which becomes a replacement target may be referred to as a target display panel.

In the display apparatus according to an embodiment, a position detection and separation method of the target display panel may vary according to an installation position or a manner of the display apparatus. For example, when the display apparatus is fixedly installed on a wall, the position detection and separation of the target display panel may be performed from a front surface of the display apparatus. Conversely, when the display apparatus is installed in an open place such as a movie theater, the position detection and separation of the target display panel may be performed from a rear surface of the display apparatus. The display apparatus according to the present disclosure is provided so that the position detection and separation of the target display panel are performed from the front or the rear surface of the display apparatus depending on a situation.

Hereinafter, for the sake of understanding, a configuration of a display apparatus according to an embodiment and a display system including the display apparatus will be described, and then operation principles of the display apparatus and a control method thereof according to the present disclosure will be described.

Figure 2:
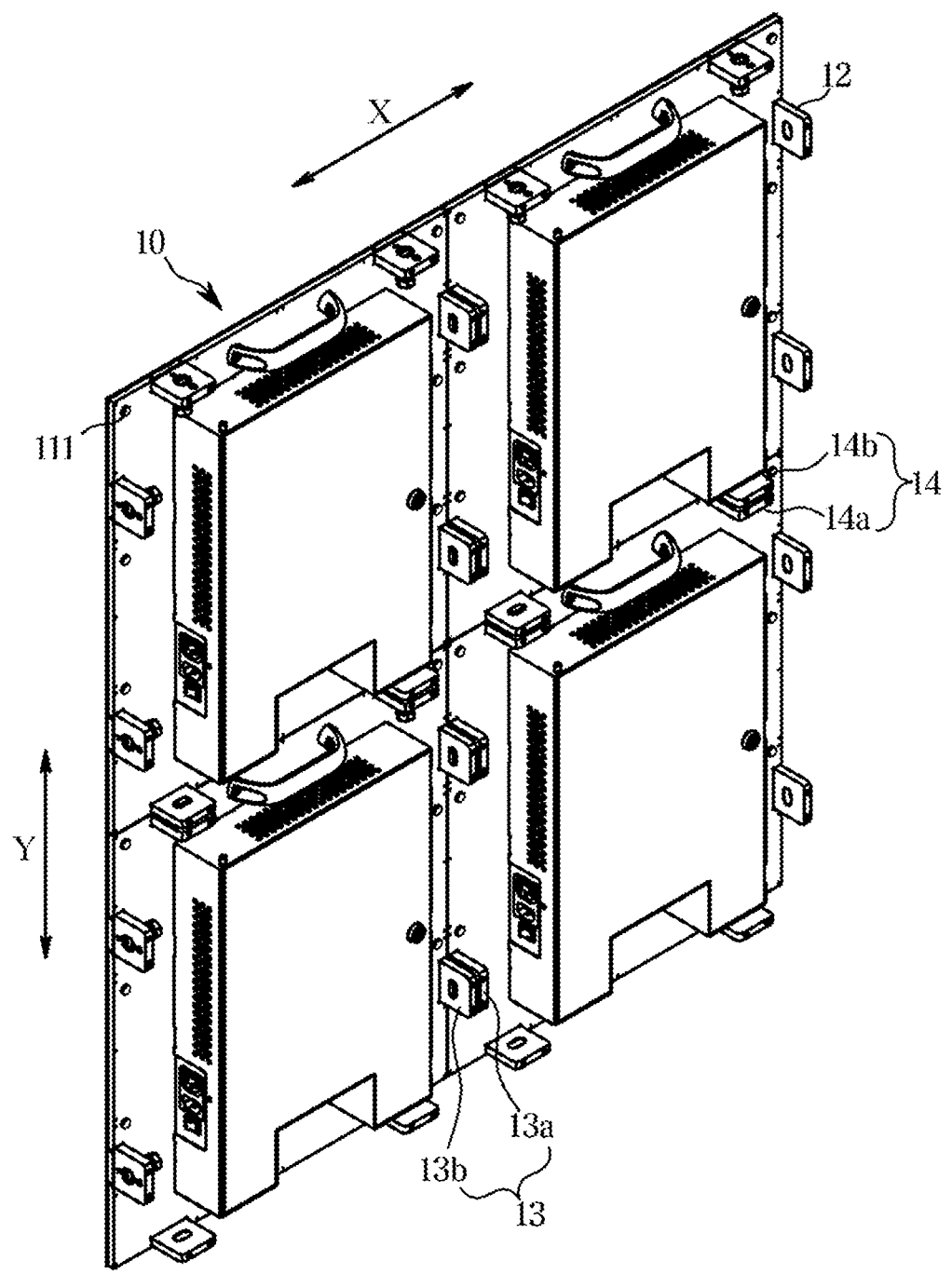
FIG. 2 is a perspective view illustrating a display apparatus of the display system of FIG. 1 when viewed from another side according to an embodiment.

FIG. 1 is a view illustrating a display system according to an embodiment, and FIG. 2 is a perspective view illustrating a display apparatus included in the display system of FIG. 1 when viewed from another side according to an embodiment.

Referring to FIG. 1, the display system according to an embodiment may include a display apparatus 10 for visually displaying an image, and an image reproducing device 20 for providing image data to the display apparatus 10. In some embodiments, the display system may include at least one of a user terminal 30 and an auxiliary tool 400 which are provided so as to detect positions of a plurality of display panels constituting the display apparatus 10.

More particularly, a different configuration may be applied to the display system according to a position at which the position detection and separation of the display panel are performed. For example, when the position detection and separation of the display panel is performed from a rear surface of the display apparatus 10, the display system may include the display apparatus 10, the image reproducing device 20, and the user terminal 30. Conversely, when the position detection and separation of the display panel is performed from a front surface of the display apparatus 10, the display system may include the display apparatus 10, the image reproducing device 20, and the auxiliary tool 400.

The display apparatus 10 may be used for a large billboard installed on an outside of a building such as a building roof or a bus stop, or may be used for a large screen of a movie theater. Here, the outside of the building is not limited to the outdoors, and may be a concept including a place at which a large number of people go in and out of, such as a subway station, a shopping mall, a movie theater, a company, a store, or the like.

The display apparatus 10 may be provided to have a structure in which the display panel can be detected and replaced from the rear surface of the display apparatus 10, or a structure in which the display panel can be detected and replaced from the front surface of the display apparatus 10. In some embodiments, the display apparatus 10 may be provided to have a structure in which the display panel can be replaced from both of the front and rear surfaces of the display apparatus 10. Hereinafter, for convenience of description, an embodiment of the present disclosure will be described by taking the case in which the display apparatus 10 is provided to have a structure in which the display panel can be replaced from both of the front and rear surfaces of the display apparatus 10 as an example. The display apparatus 10 may include a plurality of display modules 100 (100a, 100b, 100c, and 100d).

The plurality of display modules 100 (100a, 100b, 100c, and 100d) may be arranged in a first direction X, in a second direction Y, or in the first direction X and the second direction Y, according to a desired size of the display apparatus 10. Specifically, the plurality of display modules 100 (100a, 100b, 100c, and 100d) may include a first display module 100a, at least one second display module 100b arranged in the first direction X with respect to the first display module 100a, at least one third display module 100c arranged in the second direction Y with respect to the first display module 100a, and at least one fourth display module 100d arranged in the second direction Y with respect to the second display module 100b.

The plurality of display modules 100 (100a, 100b, 100c, and 100d) may form one screen as an integrated body. In other words, the plurality of display modules 100 (100a, 100b, 100c, and 100d) may display one image as an integrated body. A plurality of pixels P may be formed on the screen, and an image may be formed by a combination of light emitted from the plurality of pixels P. For example, the plurality of pixels P may emit light of various levels of brightness and various colors. A single image may be formed on the screen by combining the light emitted by the plurality of pixels P as a mosaic.

Each of the display modules 100 included in the display apparatus 10 may be provided with a plurality of display panels. A detailed structure of the display module 100 including the display panels will be described below in detail in a related part.

Referring to FIG. 2, an indicator 111 may be provided on the rear surface of the display apparatus 10 to distinguish a position of each of the display panels. The indicator 111 may be provided at any position as long as the position of the display panel can be distinguished on the rear surface of the display apparatus 10.

A cabinet 11 (FIG. 3) of the display module 100 may include at least one connecting device 12 which is provided to be coupled to another display module 100.

For example, the first display module 100a and the second display module 100b may be connected to each other in the first direction X by a first connecting device 13 which is provided on each of a cabinet 11 of the first display module 100a and a cabinet 11 of the second display module 100b.

Further, the first display module 100a and the third display module 100c may be connected to each other in the second direction Y by a second connecting device 14 which is provided on each of the cabinet 11 of the first display module 100a and a cabinet 11 of the third display module 100c.

The first connecting device 13 may include at least one first link 13a provided on one sides of the first display module 100a and the second display module 100b and at least one second link 13b provided on other sides thereof, and the second connecting device 14 may include at least one third link 14a provided on one sides of the first display module 100a and the third display module 100c and at least one fourth link 14b provided on other sides thereof.

The image reproducing device 20 may include a memory capable of storing contents, including video, or may receive contents from an external content source (e.g., a video streaming service server). For example, the image reproducing device 20 may be provided to store a file of content data in the memory or receive content data from the external content source.

The image reproducing device 20 may decode the stored or received content data into image frame data. For example, the content data may be compressed by various video compression standards such as Moving Picture Experts Group (MPEG), High Efficiency Video Coding (HEVC), and the like. The image reproducing device 20 may restore the image frame data representing each image frame from the compressed content data.

The image reproducing device 20 may transmit the restored image frame data to the display apparatus 10. The image reproducing device 20 may transmit the image frame data to the display apparatus 10 through a separate image data transmission line.

The image reproducing device 20 may be provided separately from the display apparatus 10, as shown in FIG. 1. In some embodiments, the image reproducing device 20 may be provided in the form of being integrated with the display apparatus 10.

The user terminal 30 is a component provided for efficient operation when the display panel is replaced from the rear surface of the display apparatus 10 and is provided to be selectively connectable to the display apparatus 10 via a network.

More specifically, the user terminal 30 provides a display screen image partitioned into a plurality of regions corresponding to the installation positions of the plurality of display panels so as to detect the positions of the plurality of display panels. A user may input a position detection command for a display panel corresponding to a specific region by selecting the specific region of the display screen image.

The user terminal 30 receives a position detection command for a target display panel from the user and transmits a signal for detecting a position of the target display panel to the display apparatus 10. Hereinafter, the signal for detecting the position of the display panels is defined as a position detection command. When the display apparatus 10 receives the position detection command from the user terminal 30, the display apparatus 10 may display a preset image on the target display panel or turn the indicator corresponding to the target display panel on. The operation of displaying the preset image on the target display panel and the operation of turning the indicator on may be performed independently. In some embodiments, the operations may be performed simultaneously.

The user may determine whether the target display panel is normally operating using the image provided on the display panel and the user may identify a boundary with other display panels. In addition, when it is determined that the replacement of the display panel is necessary, the user may recognize the target display panel through the indicator provided on the rear surface of the display apparatus, and thus the replacement of the display panel performed from the rear surface of the display apparatus 10 may be performed efficiently.

The user terminal 30 may be implemented as a computer or a portable terminal that can be connected to the display apparatus 10 via the network.

Here, the computer may include a notebook computer, a desktop computer, a laptop computer, a tablet personal computer (PC), a slate PC, or the like, in which a web browser is installed. The portable terminal may be a wireless communication device that ensures portability and mobility and may include all types of handheld wireless communication devices, such as a Personal Communication System (PCS) terminal, a Global System for Mobile communications (GSM) terminal, a personal digital cellular (PDC) terminal, a Personal Handy-phone System (PHS) terminal, a personal digital assistant (PDA), an International Mobile Telecommunication (IMT)-2000 terminal, a code-division multiple access (CDMA)-2000 terminal, a wideband code-division multiple access (W-CDMA) terminal, a wireless broadband (Wibro) terminal, a smart phone, and the like, and wearable devices such as glasses, contact lenses, and the like.

The auxiliary tool 400 is a component provided for efficient operation when the display panel is replaced from the front surface of the display apparatus 10. The auxiliary tool 400 may be formed to have a size and shape of the display panel and may improve the efficiency of the operation when the display panel is separated from the front surface of the display apparatus 10 using a magnetic force principle. A configuration of operation principle of the auxiliary tool 400 will be described below according to an embodiment.

Hereinafter, configurations of the display module 100 and the display panel included in the display apparatus 10 will be described.

Figure 3:
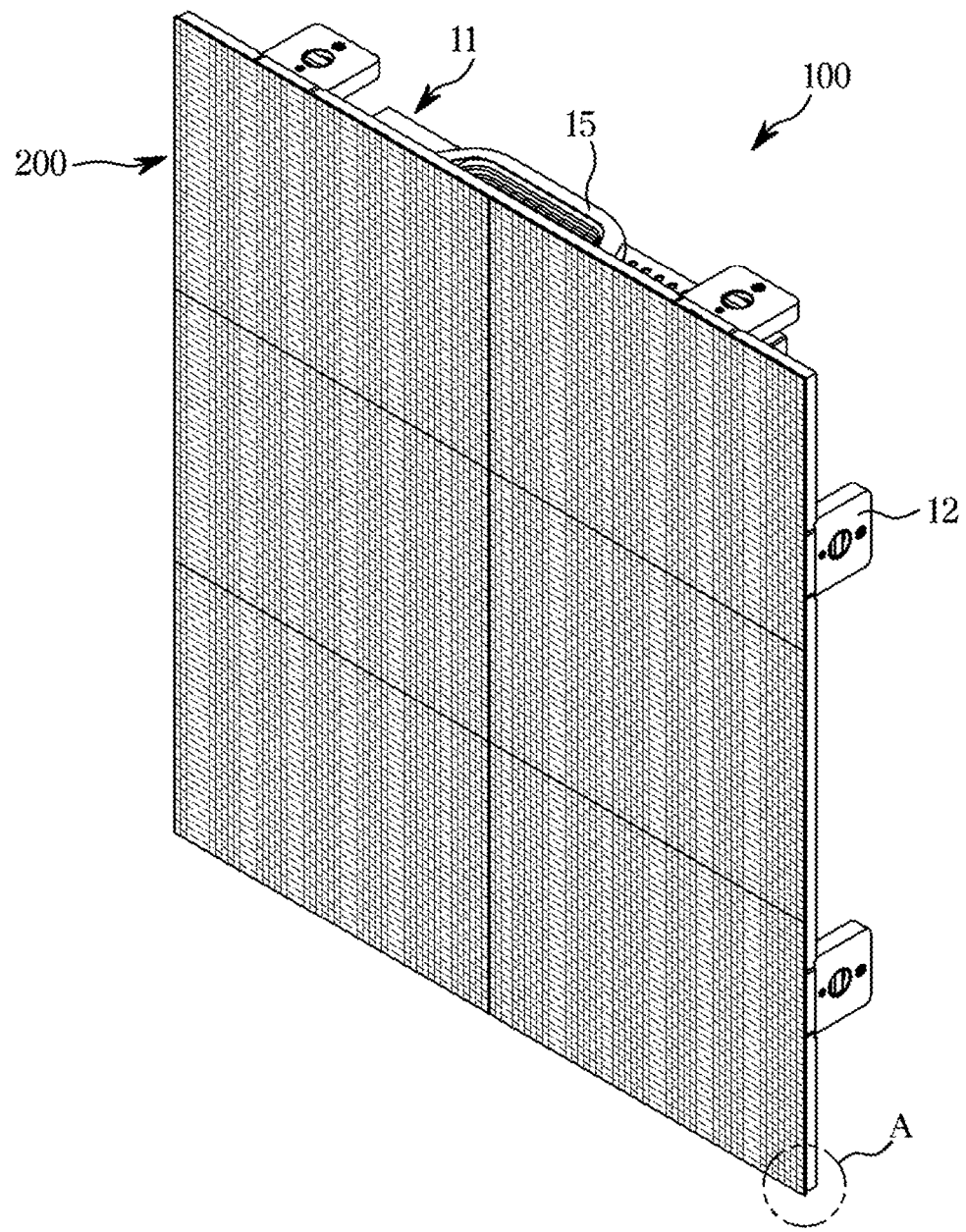
FIG. 3 is a perspective view illustrating an exterior of a display module when viewed from one side according to an embodiment.
Figure 4:
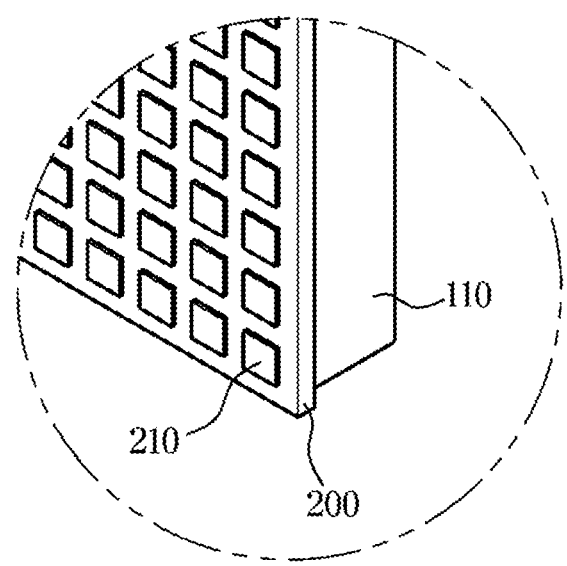
FIG. 4 is an enlarged perspective view illustrating a portion A of FIG. 3 according to an embodiment.
Figure 5A:
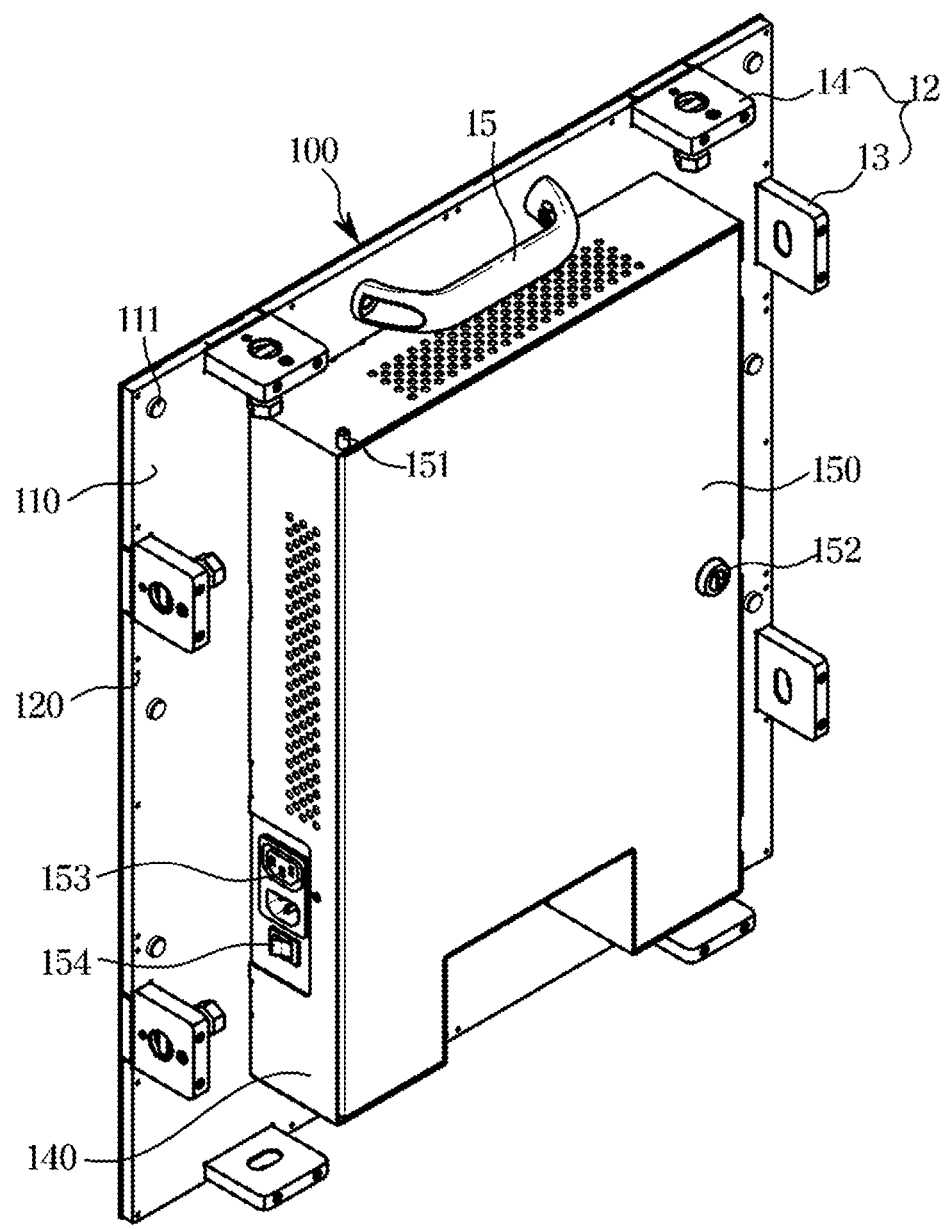
FIGS. 5A-5C are perspective views illustrating the exterior of the display module of FIG. 3 when viewed from another side according to an embodiment.
Figure 5B:
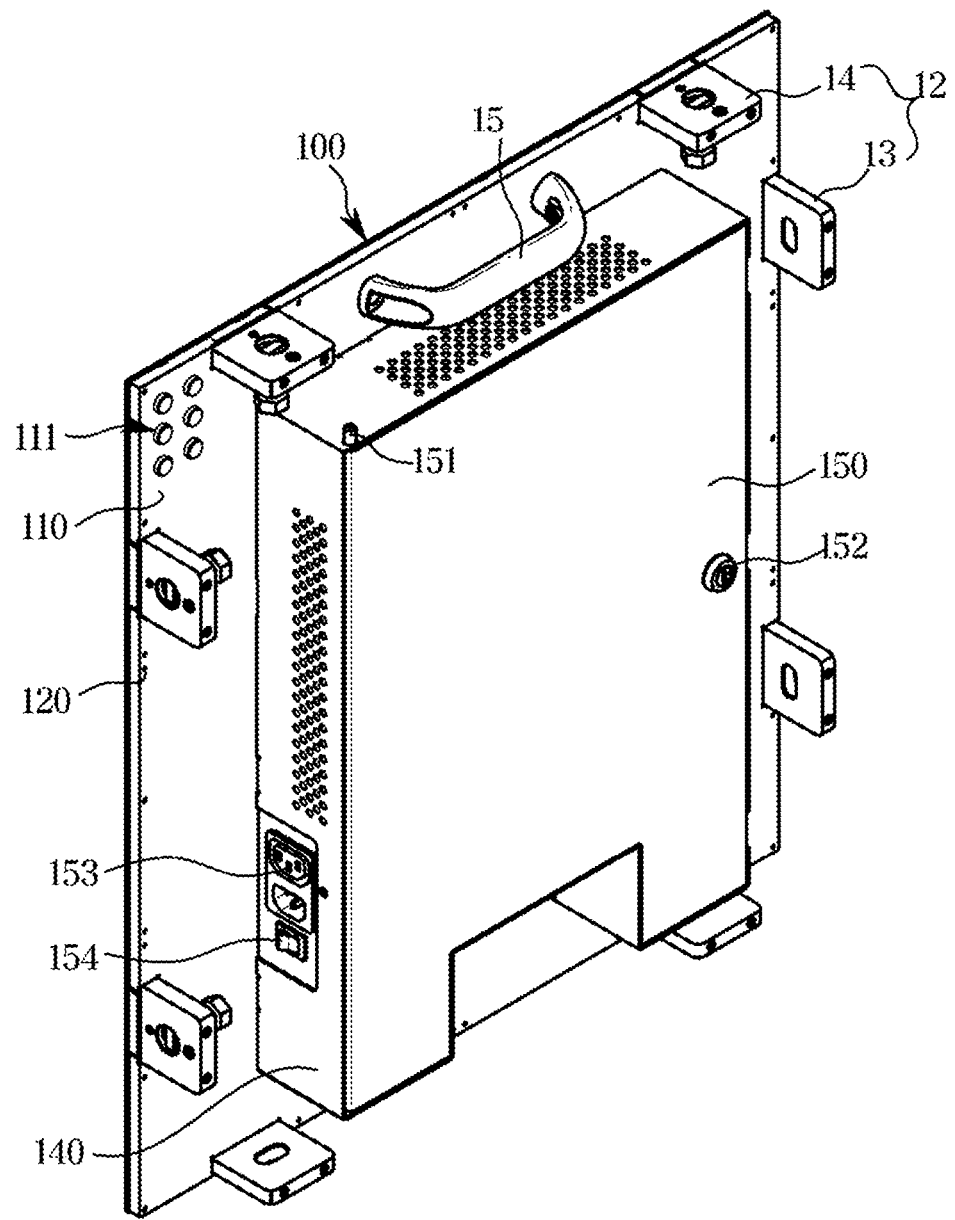
Figure 5C:
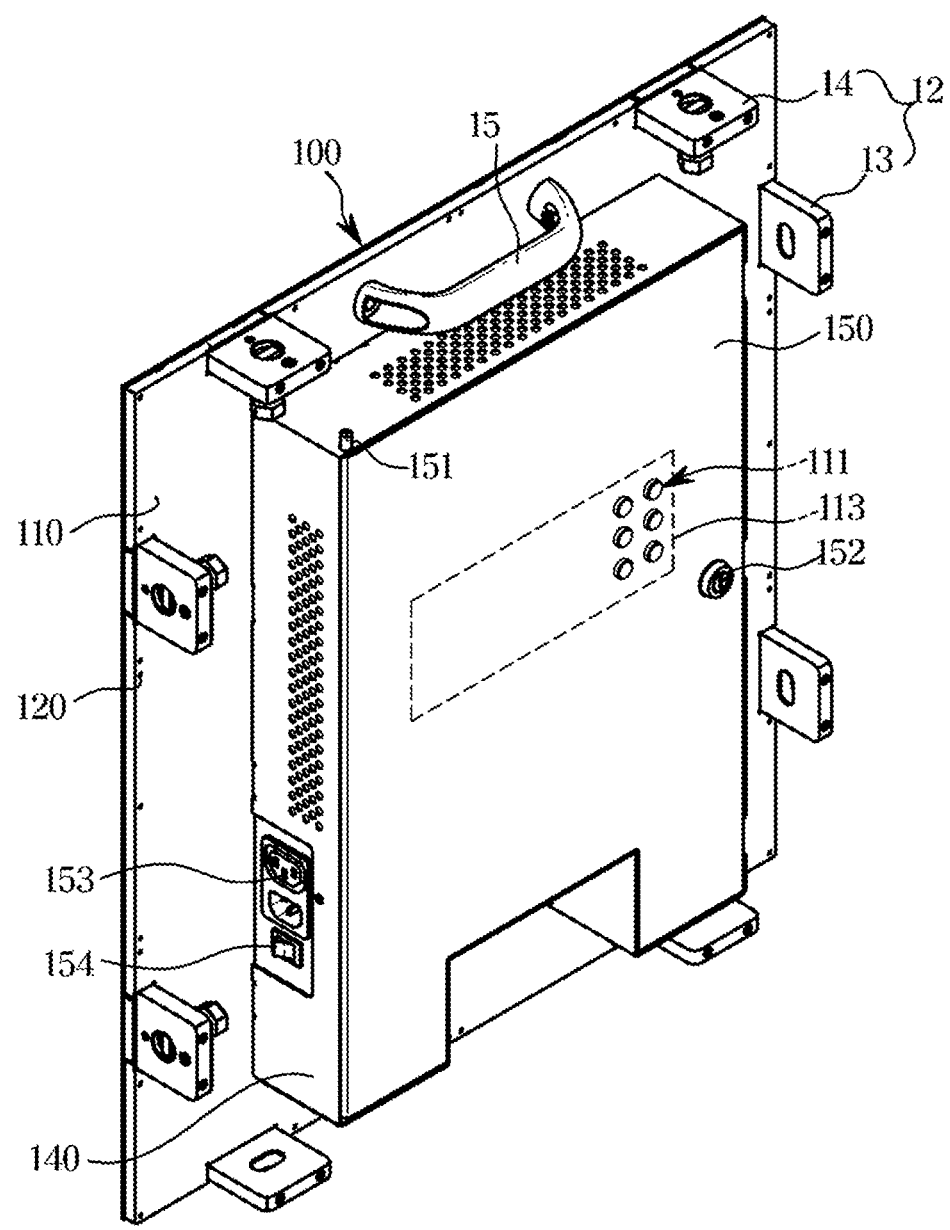

FIG. 3 is a perspective view of an exterior of a display module when viewed from one side according to an embodiment, FIG. 4 is an enlarged perspective view of portion A of FIG. 3 according to an embodiment, and FIGS. 5A-C are perspective views of the exterior of the display module of FIG. 3 when viewed from another side according to an embodiment.

Referring to FIGS. 3 to 5C, a display module 100 may include a cabinet 11 and a plurality of display panels 200 arranged in the cabinet 11. Hereinafter, the display panels 200 may be provided as a light-emitting diode (LED) panel, an organic light-emitting diode (OLED) panel, or the like. Hereinafter, an embodiment will be described by taking the case in which the display panels 200 are provided as LED panels by way of an example.

The cabinet 11 may include a base plate 110 (FIG. 4), on which the display panels 200 are mounted, a sidewall 140, and a door 150 (FIG. 5A).

An indicator 111 may be provided on the base plate 110 to distinguish the display panel 200 mounted on the base plate 110. The indicator 111 is a component configured to allow the user to easily recognize a target display panel 200 from a rear surface of the display apparatus 10 when the separation of the display panel 200 is performed on the display apparatus 10.

To this end, the indicator 111 may be provided on a rear surface of the base plate 110. Referring to FIG. 5A, the indicator 111 may be provided at a position of the rear surface of the base plate 110, which corresponds to a position of each display panel 200, and may be provided at a position of the rear surface of the base plate 110 that corresponds to a position of a specific portion (e.g., an edge) of each display panel 200 so that the user may easily identify the position of the display panel 200.

Meanwhile, the installation position of the indicator 111 is not limited to that in the above example, and the indicator 111 may be provided at any position of the base plate 110 within a range that allows the user to easily identify the position of the display panel 200. For example, in order to allow the user to identify the position of the display panel 200 at a glance, the indicator 111 may be provided in one region of the base plate 110 according to an arrangement shape of the display panel 200 as shown in FIG. 5B, or may be provided on a control board 113 provided inside the door 150 of the base plate 110 as shown in FIG. 5C. Hereinafter, an embodiment of the present disclosure will be described based on the assumption that the indicator 111 is provided as shown in FIG. 5A for convenience of description.

The indicator 111 may be a concept including an optical device configured to output preset light. In addition, in some embodiments, the indicator 111 may allow light of various colors to be generated and may provide various types of information to the user. An operation of the indicator 111 will be described below in further detail.

A connecting device 12 provided to be coupled to another display module 100 and a handle 15 provided to facilitate the movement of the display module 100 may be formed on the base plate 110.

The sidewall 140 may be coupled to the base plate 110, and the door 150 may be coupled to the sidewall 140 by a hinge 151. A door lock 152 may be provided on a side opposite to a side on which the door 150 is coupled to the sidewall 140 by the hinge 151.

The control board provided to control the plurality of display panels 200 and a power supply provided to supply power to the display panels 200 may be disposed inside the cabinet 11. A space may be provided in the sidewall 140 or the door 150 so that various terminals connected to the control board may be exposed to the outside. In addition, a power supply terminal 153 through which power may be input or output and a switch 154 for turning a power source on or off may be provided on the door 150 or the sidewall 140.

For convenience in maintenance of the display module 100, a rear cover of the cabinet 11 is provided as a hinged door 150. In order to connect the display module 100 to another display module 100 in a cascade manner so as to easily supply power to each of the display modules 100 when the display module 100 is coupled to another display module 100, an inlet terminal and an outlet terminal are simultaneously provided in the power supply terminal 153.

The display panel 200 may include a display substrate 220 (FIG. 7) on which a plurality of LEDs 210 are arranged.

When the plurality of display panels 200 are mounted on the cabinet 11, a boundary line or a seam may be formed between the display panels 200 disposed adjacent to each other. When sizes of the LEDs 210 arranged on the display substrate 220 to form a high-quality image are reduced, an interval between the LEDs 210 is reduced. When an interval between the display panels 200 is greater than the interval between the LEDs 210 or when a step occurs between the display panels 200, the boundary line between the display panels 200 is visible.

In the display apparatus 10 according to an embodiment, the display panels 200 may be arranged close to each other in order to realize a seamless display in which the boundary line between the display modules 100 is not visible. The display apparatus 10 may include a plurality of adjusters 120 (FIGS. 5A-5C) configured to adjust a step or space between the display panels 200.

Hereinafter, a structure of a coupling device for mounting or separating the display panel 200 on or from the display module 100 will be described according to an embodiment.

The coupling device for mounting or separating the display panel 200 on or from the display module 100 may be provided to be magnetically coupled to the display panel 200 or may be provided to be coupled to the display panel 200 in a physical structure.

When the display panel 200 is provided to be magnetically coupled to the display module 100, the user may perform the separation of the display panel 200 from the front or rear surface of the display apparatus 10. On the other hand, when the display panel 200 is provided to be coupled to the display module 100 by a mechanical fastening structure such as a screw, the user may perform the separation of the display panel 200 from the rear surface of the display apparatus 10.

Hereinafter, an example of forming the coupling structure will be described on the assumption that the display panel 200 is magnetically coupled to the display module 100 for convenience of explanation.

Figure 6:
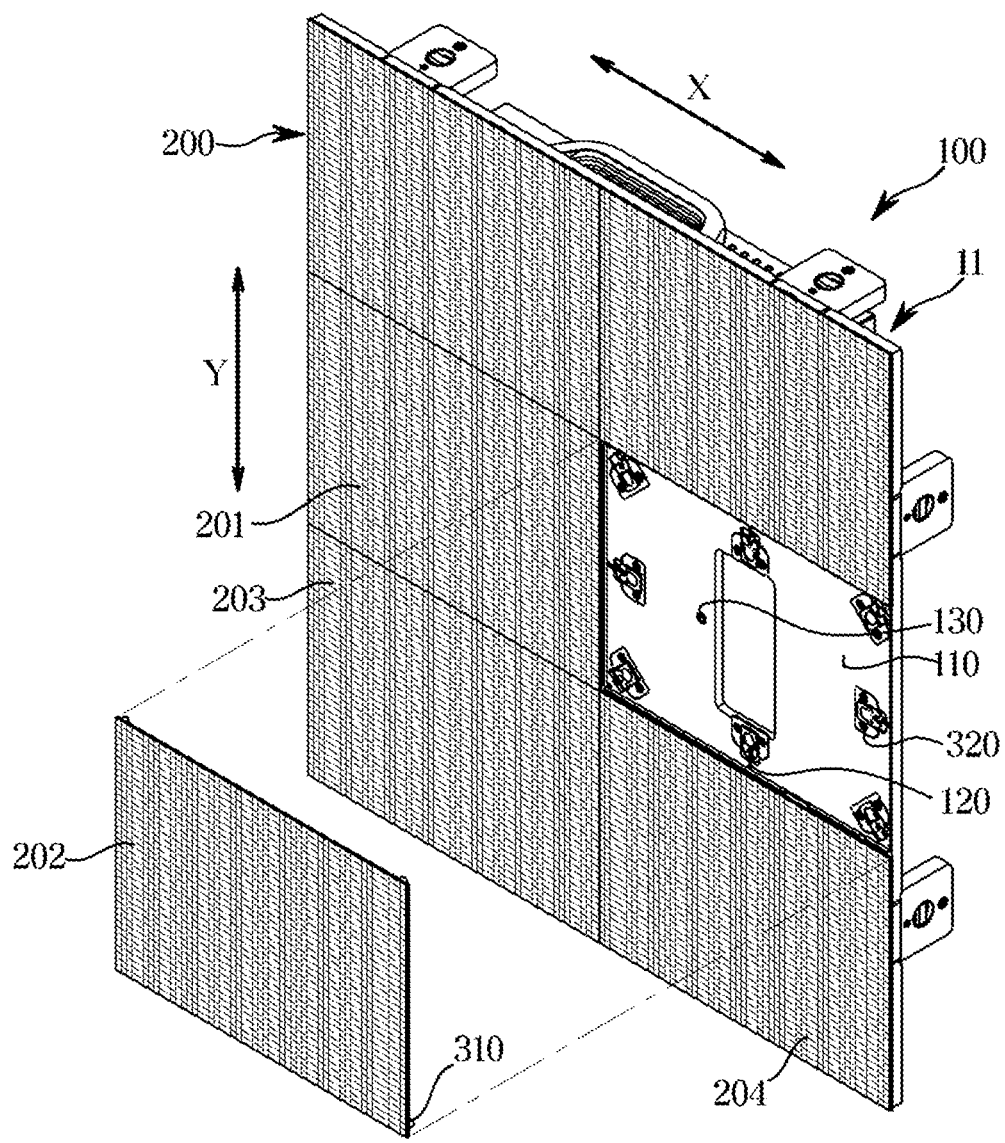
FIG. 6 is an exploded perspective view illustrating one display panel in the display module of FIG. 3 according to an embodiment.
Figure 7:
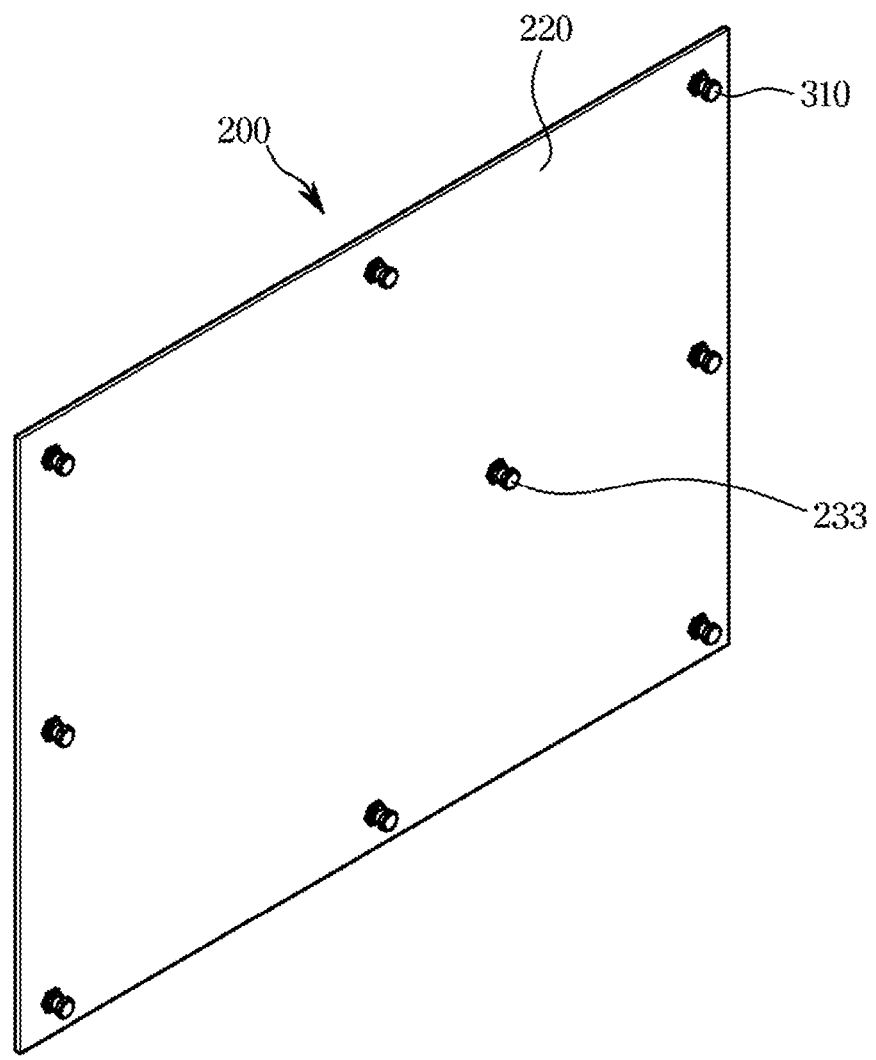
FIG. 7 is a perspective view illustrating a display panel of the display module of FIG. 6 when viewed from another side according to an embodiment.
Figure 8:
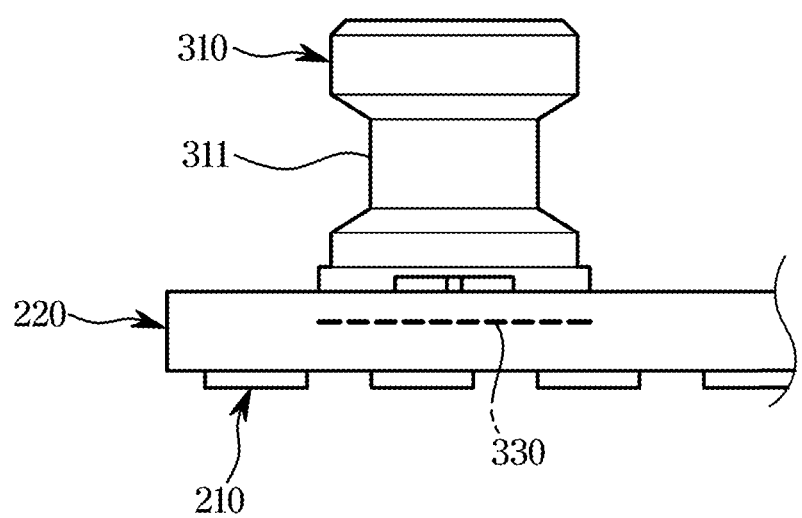
FIG. 8 is a side view illustrating a coupling member provided in the display panel of FIG. 7 according to an embodiment.
Figure 9:
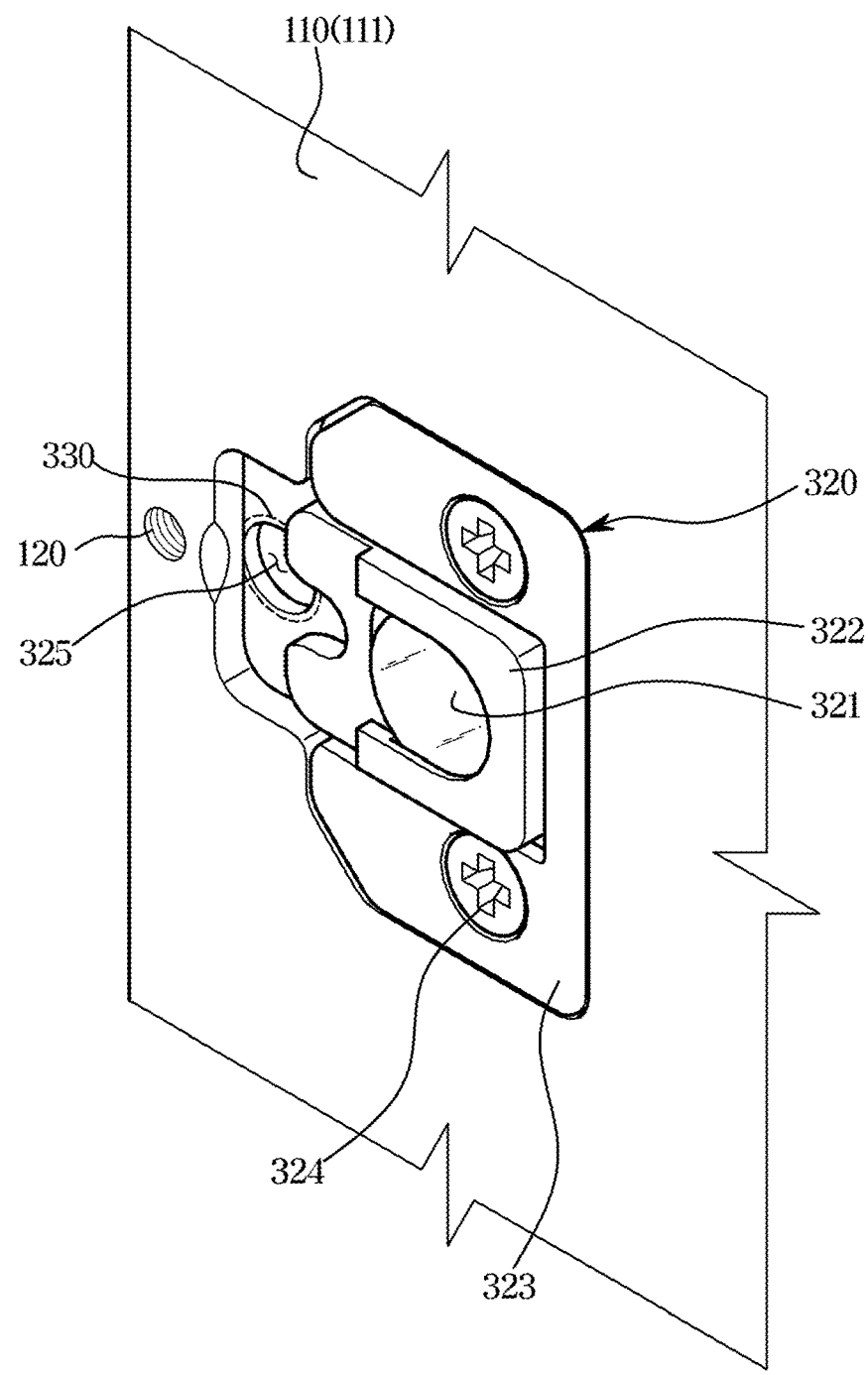
FIG. 9 is a perspective view illustrating a coupling member provided in the cabinet of FIG. 6 according to an embodiment.
Figure 10:
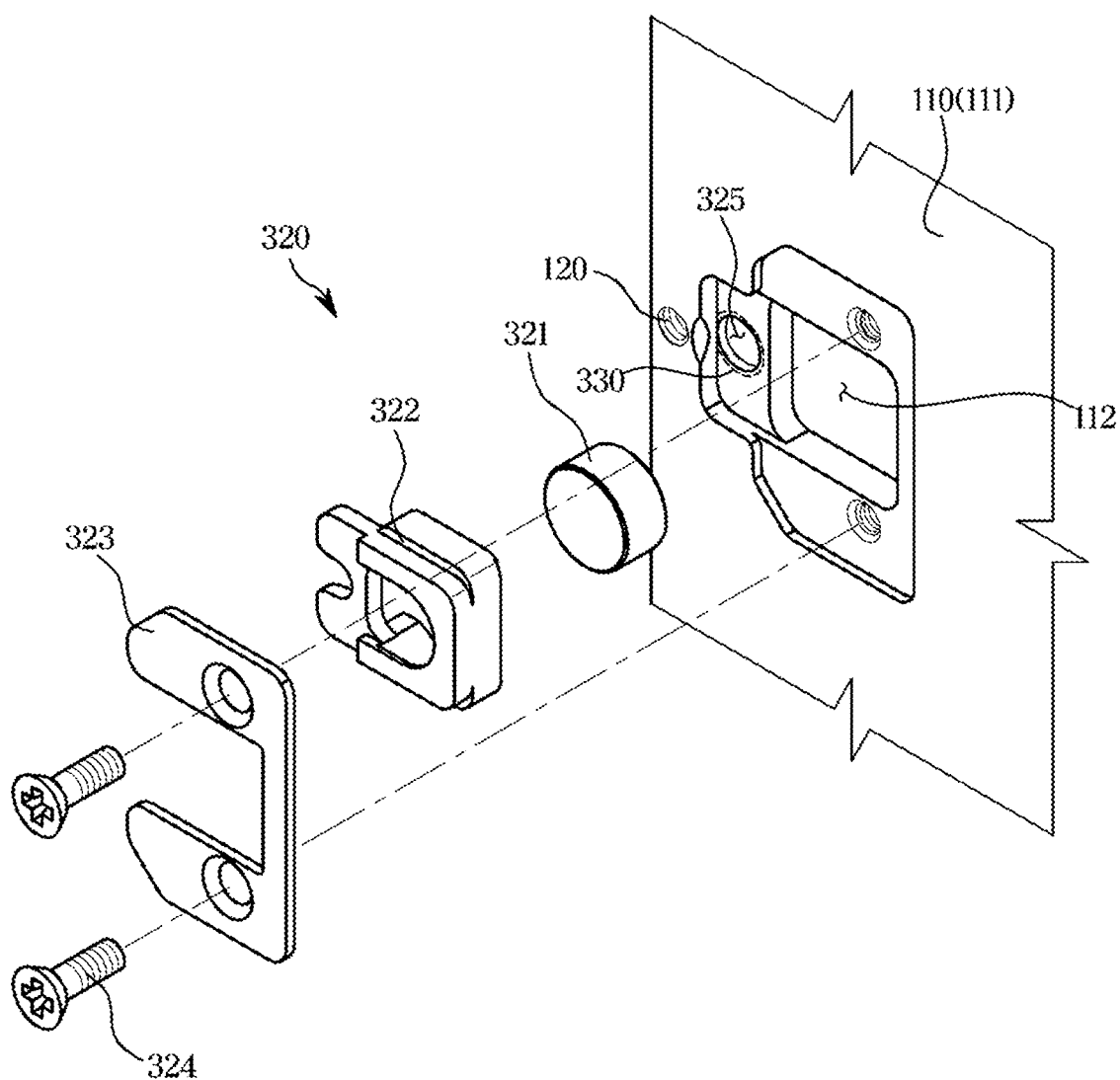
FIG. 10 is an exploded perspective view illustrating a coupling member provided in a cabinet of the display module of FIG. 6 according to an embodiment.
Figure 11:
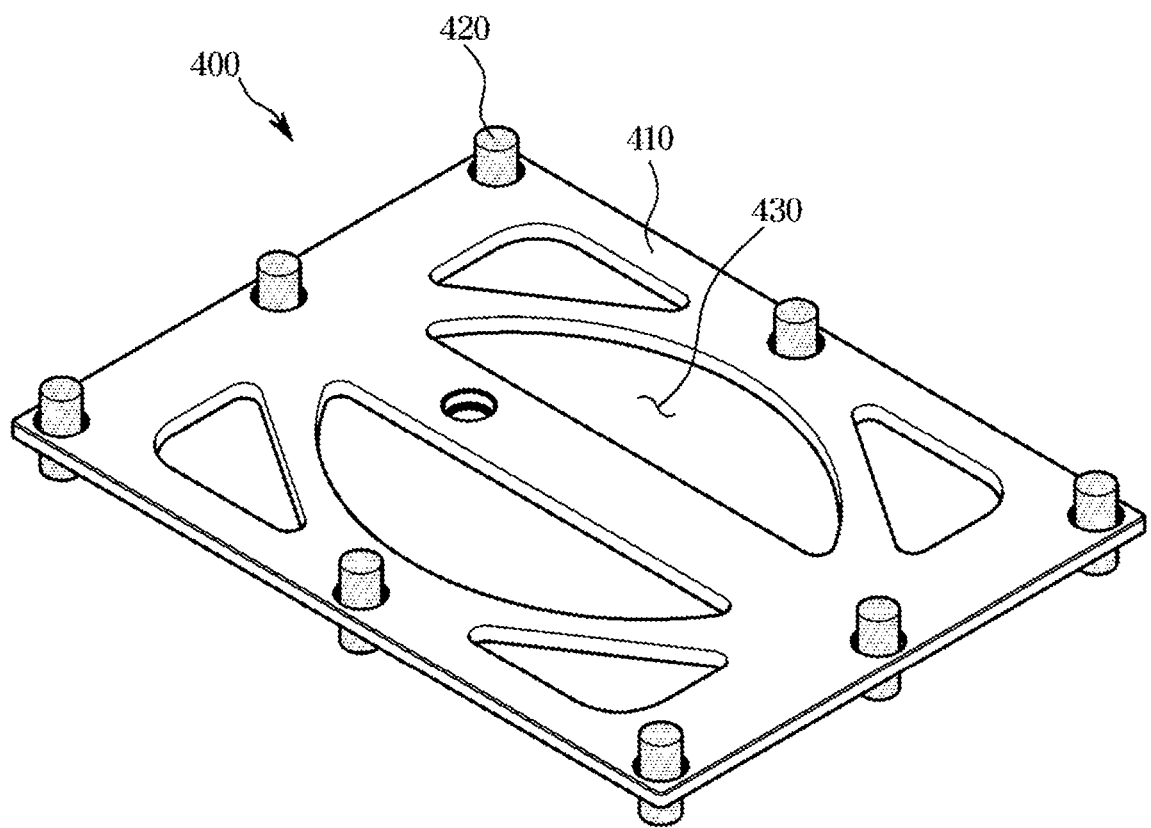
FIG. 11 is a perspective view illustrating an auxiliary tool used for assembling and separating a display panel according to an embodiment.

FIG. 6 is an exploded perspective view illustrating one display panel in the display module of FIG. 3 according to an embodiment, FIG. 7 is a perspective view illustrating the display panel of the display module of FIG. 6 when viewed from another side according to an embodiment, FIG. 8 is a side view illustrating a coupling member provided in the display panel of FIG. 7 according to an embodiment, FIG. 9 is a perspective view illustrating an auxiliary tool used for assembling and separating the display panel according to an embodiment, FIG. 10 is an exploded perspective view illustrating a coupling member provided in a cabinet of the display module of FIG. 6 according to an embodiment, and FIG. 11 is an enlarged perspective view illustrating the coupling member provided in the cabinet of FIG. 9 according to an embodiment.

Referring to FIG. 6, a display panel 200 included in a display module 100 according to an embodiment may include a first display panel 201, a second display panel 202 disposed in a first direction X with respect to the first display panel 201, a third display panel 203 disposed in a second direction Y with respect to the first display panel 201, and a fourth display panel 204 disposed in the second direction Y with respect to the second display panel 202, according to an exemplary embodiment.

The display module 100, shown in FIG. 6, is one embodiment of the present disclosure. The display module 100 includes a total of six display panels 200 in two rows in the first direction X and three rows in the second direction Y. However, the number of the display panels 200 constituting the display module 100 is not limited thereto, and may be variously changed according to the designer's intention.

The display module 100 may include a coupling device configured to detachably mount the plurality of display panels 200 from the cabinet 11. The following description exemplifies one of the methods of forming the coupling device, but the present disclosure is not limited to the structure of the coupling device described above.

The coupling device may include first coupling members 310 provided on the plurality of display panels 200 and second coupling members 320 provided on the cabinet 11.

Referring to FIG. 7, the first coupling members 310 may be provided on a rear surface of the display substrate 220. The first coupling members 310 may be respectively provided at central portions of four borders and the four corners of the rectangular display substrate 220. Further, the display panel 200 may include a guide member 233 provided to be spaced apart from a central portion of the display panel 200 in an arbitrary direction in order to guide a direction in which the display panel 200 is mounted on the cabinet 11.

Referring to FIG. 8, the first coupling member 310 may be formed on a surface opposite to a surface of the display substrate 220 on which the LEDs 210 are arranged by soldering or the like. The first coupling member 310 may include a material magnetized in a magnetic field, i.e., a magnetic substance, or may be formed of a magnetic substance.

The first coupling member 310 may include an engaging portion 311 provided to prevent the first coupling member 310 from separating when being coupled to the second coupling member 320 (shown in FIG. 8). As shown in FIG. 8, the engaging portion 311 may be formed in a shape in which a portion of the columnar first coupling member 310 is recessed, and may be formed in any shape so that the first coupling member 310 may not be separated when being coupled to the second coupling member 320.

A detection circuit 330 provided to detect a change in magnetic flux generated around the first coupling member 310 may be formed around the first coupling member 310. The detection circuit 330 may include a pattern formed in a shape of winding around the first coupling member 310.

The detection circuit 330 is connected to a controller of the display apparatus 10, which will be described below, to transmit a detection signal generated in the detection circuit 330 to the controller.

The detection circuit 330 is provided for the purpose of detecting a target display panel 200 when the user performs the position detection and separation of the display panel 200 from the front surface of the display apparatus 10.

More specifically, the user may perform the position detection and separation of the target display panel 200 using the auxiliary tool 400 which will be described below. Hereinafter, a structure of the auxiliary tool will be briefly described with reference to the accompanying drawings and then a configuration of the detection circuit 330 will be described in more detail, according to an embodiment.

FIG. 11 is a perspective view illustrating an auxiliary tool used for assembling and separating the display panel according to an embodiment.

Referring to FIG. 11, an auxiliary tool 400 may include a body 410 and a magnet 420. The body 410 may be formed in a size and shape corresponding to a size and shape of the display panel 200, and the magnet 420 may be provided at a position corresponding to a position of the first coupling member 310 provided on the display panels 200. A plurality of magnets 420 provided in the auxiliary tool 400 are arranged such that the same poles are directed in the same direction.

An opening 430 may be provided in the body 410 of the auxiliary tool 400. The opening 430 may be used as a space for pushing the display panel 200 when the auxiliary tool 400 is attached to the LED panel 200 by a magnetic force and is then removed from the display panel 200. Because the opening 430 is formed, a portion of the body 410 may be used as a handle. However, in some embodiments, a separate handle may be provided on the body 410.

Both poles of the magnet 420 provided on the auxiliary tool 400 may be used such that an attractive force or a repulsive force acts on a magnet 420 included in the second coupling member 320 according to an embodiment in which the display panel 200 is assembled or separated into or from the cabinet 11 (as described in further detail with reference to FIGS. 9 and 10). Therefore, it is possible to use the auxiliary tool 400 in an inverted manner according to a polarity of the required magnet 420. Although not shown in the drawings, when the magnet 420 is provided as an electromagnet, the auxiliary tool 400 may be used by changing its polarity without being inverted.

As described above, since the auxiliary tool 400 is provided with the magnet at the position corresponding to that of the first coupling member 310, when the auxiliary tool 400 approaches around the first coupling member 310 of the display panel 200, a detection signal is generated in the detection circuit 330 due to a change in magnetic flux around the detection circuit 330. The detection signal generated in the detection circuit 330 may be transmitted to the controller of the display apparatus 10, and the controller of the display apparatus 10 may provide a preset image to the display panel 200 on the basis of the received detection signal.

The user may identify the position of the target display panel 200 using the image displayed on the display panels 200 and visually identify whether the target display panel 200 is defective or not.

Meanwhile, a plurality of first coupling members 310 may be provided on the display substrate 220, and the detection circuit 330 may be provided around each of the first coupling members 310. The detection circuits 330 formed in this manner may be connected in series. When the plurality of detection circuits 330 are formed in a serial connection structure, it is possible to detect the position of the target display panel 200 even when a signal is detected from any one of the plurality of detection circuits 330. Therefore, the detection probability of the target display panel 200 may be increased when the display panel 200 is replaced.

In addition, the detection circuit 330 may be patterned in a shape winding around a portion in which the first coupling member 310 and the display substrate 220 are coupled. When the number of patterned windings is increased, an electromotive force corresponding to a change in magnetic flux around the detection circuit 330 is increased so that the detection sensitivity of the detection circuit 330 may be increased. However, the method of forming the detection circuit 330 is not limited to the above-described method. In some embodiments, the detection circuit 330 may be provided so as to be patterned around an accommodation groove 325 of the second coupling member 320, which will be described below. Referring again to FIG. 6, the plurality of second coupling members 320 for fixing the display panel 200 to the cabinet 11 may be provided on the base plate 110 of the cabinet 11. The plurality of second coupling members 320 are provided to respectively correspond to the plurality of first coupling members 310 provided on the display panel 200.

Further, a threaded or step adjuster 120 configured to adjust a step between the display panels 200 may be provided around the second coupling member 320 of the base plate 110, as shown in further detailed in FIGS. 9 and 10, described below.

Further, a guide groove 130 into which the guide member 233 (FIG. 7) of the display panel 200 is inserted may be provided in the base plate 110. The guide member 233 is inserted into the guide groove 130 when the display panel 200 is mounted on the cabinet 11 in a correct direction.

Referring to FIGS. 9 and 10, an embedded portion 112 which forms a space in which parts of the coupling device are embedded may be provided on the base plate 110, and the second coupling member 320 may be provided to be embedded in the embedded portion 112 formed in the base plate 110 of the cabinet 11.

The accommodation groove 325 which is provided to accommodate the first coupling member 310 may be formed in the embedded portion 112.

Further, when the first coupling member 310 is accommodated in the accommodation groove 325, a locking portion 322 provided to fix the engaging portion 311 of the first coupling member 310 may be provided in the embedded portion 112.

The locking portion 322 may be provided to be movable to a locked position and a release position. Specifically, the locking portion 322 may be provided to move to the locked position or the release position by a magnetic force. To this end, the locking portion 322 may be provided as a magnet or a separate magnet 321 may be disposed around the locking portion 322. In the above structure, a cover 323 may be fixed to the base plate 110 using a fixing member 324.

The fixing member 324 may be formed of a magnetic substance or may include a magnetic substance. Therefore, when the second coupling member 320 is not coupled to the first coupling member 310 and there is no external force, the locking portion 322 may maintain the release position by a magnetic attractive force between the magnet 321 and the fixing member 324. The second coupling member 320 may include a separate magnetic substance that allows the fixing member 324 and the locking portion 322 to be at the release position.

An operation principle of the locking portion 322 will be briefly described as follows, according to an embodiment.

First, when the first coupling member 310 is accommodated in the accommodation groove 325 of the second coupling member 320 and then the locking portion 322 is moved to the locked position by an external magnetic attractive force using a separate magnet or the like, a distance between the magnet 321 and the first coupling member 310 becomes smaller than a distance between the magnet 321 and the fixing member 324 and a magnetic attractive force with the first coupling member 310 becomes larger than a magnetic attractive force with the fixing member 324. Therefore, the locking portion 322 maintains the locked position due to the magnetic attractive force with the first coupling member 310.

On the other hand, when the first coupling member 310 coupled to the second coupling member 320 is magnetized using a separate magnet or the like so that a magnetic repulsive force acts on the magnet 321 included in the locking portion 322, the locking portion 322 is moved to the release position, the display panel 200 is separated from the cabinet 11, and then the locking portion 322 maintains the release position due to the magnetic attractive force between the magnet 321 and the fixing member 324.

As another configuration of the second coupling member 320 excluding the magnet 321 and the fixing member 324, the second coupling member 320 may be formed of a non-magnetic substance that does not react with a magnetic force and the cabinet 11 and the display panels 200 may also be formed of a non-magnetic substance.

The structure of the display apparatus 10 in which the display panel 200 is replaceable from the front or rear surface of the apparatus, according to an embodiment, has been described. Next, a detailed control configuration of the display apparatus 10, according to an embodiment, will be described in more detail with reference to the following control block diagrams.

Figure 12:
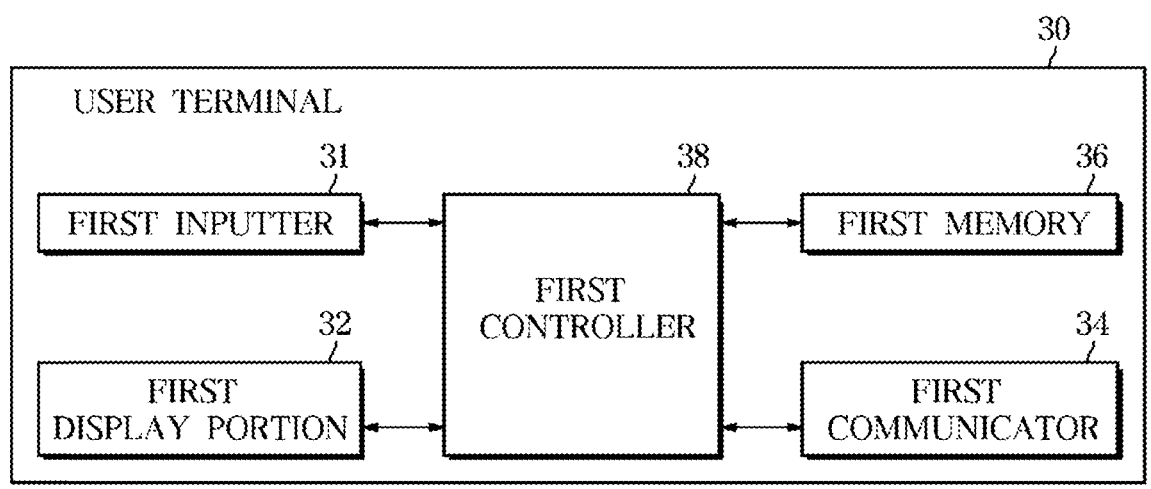
FIG. 12 is a control block diagram illustrating a user terminal according to an embodiment.
Figure 13:
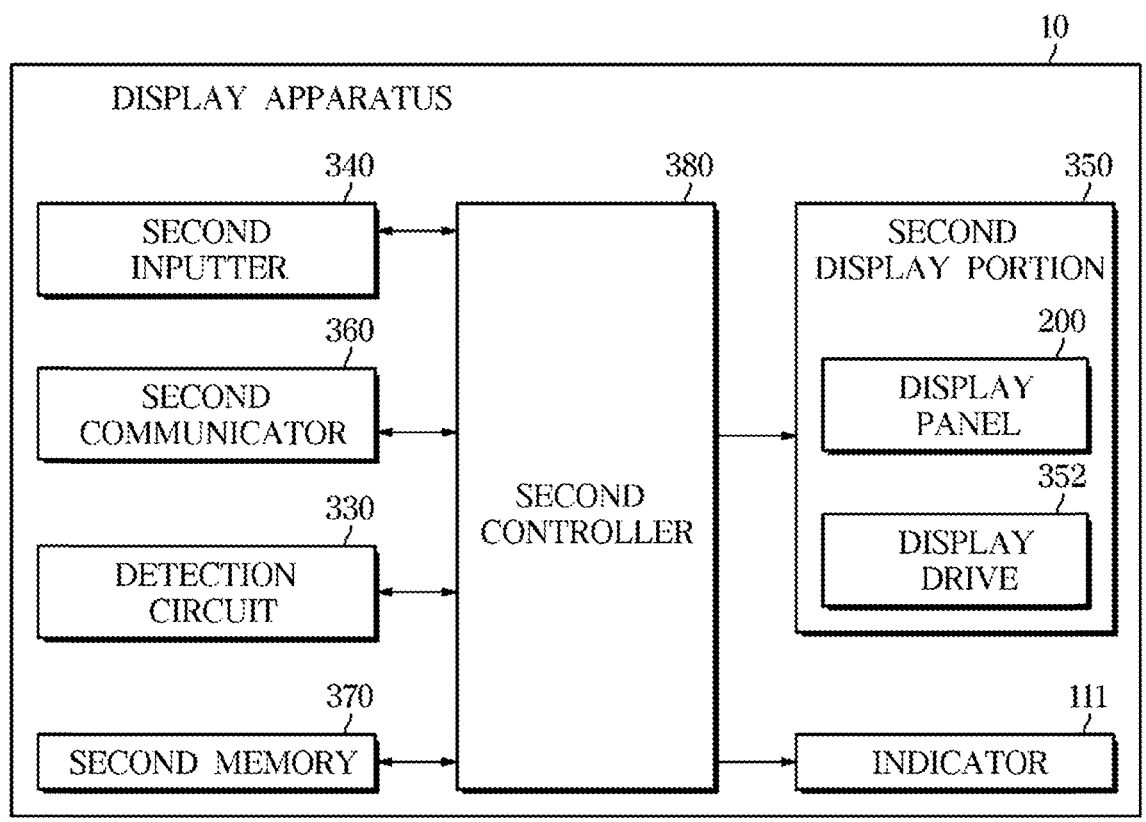
FIG. 13 is a control block diagram illustrating a display apparatus according to an embodiment.

FIG. 12 is a control block diagram illustrating a user terminal 30 according to an embodiment, and FIG. 13 is a control block diagram illustrating a display apparatus 10 according to an embodiment.

Hereinafter, a configuration of the user terminal 30 will be described and then a configuration of the display apparatus 10 will be described for convenience of description.

First, the user terminal 30 is provided to be capable of communicating with the display apparatus 10 when the replacement of a display panel 200 is performed from a rear surface of the apparatus.

The user terminal 30 may receive a user input from the user and transmit the user input to the display apparatus 10 by communication therebetween. More specifically, the user terminal 30 is provided to be selectively connectable to the display apparatus 10 via the network. The user terminal 30 receives the user input for detecting positions of display panels and transmits the received user input to the display apparatus 10.

Referring to FIG. 12, the user terminal 30 may include an inputter 31, a display portion 32, a communicator 34, a memory 36, and a controller 38. Hereinafter, in order to distinguish control components of the display apparatus 10 which will be described below, the inputter 31, the display portion 32, the communicator 34, the memory 36, and the controller 38 of the user terminal 30 are referred to as a first inputter 31, a first display portion 32, a first communicator 34, a first memory 36, and a first controller 38, respectively.

The first inputter 31 may receive the user input from the user and output an electrical signal corresponding to the user input to the first controller 38. Specifically, the first inputter 31 may receive a position detection command for at least one of the plurality of display panels from the user or receive an error detection command for the plurality of display panels and output an electrical signal corresponding to the user input to the first controller 38.

In this specification, the position detection command for at least one of the plurality of display panels may include a position detection command for any one display panel of the plurality of display panels 200 which is sequentially input, and in some embodiments, may include a position detection command for two or more display panels of the plurality of display panels which are simultaneously input. Further, the error detection command is a command which allows the display apparatus 10 itself to detect an error generated in the display panel 200, and some errors may be detected preferentially through the present command.

The first inputter 31 may be provided to receive the position detection command for the plurality of display panels from the user and then receive a determination command for a corresponding display panel 200. Here, the determination command is a command to continuously maintain the indicator 111, which is turned on when the corresponding display panels 200 is selected, to be turned on. The user may input the determination command for the display panel 200 which becomes a replacement target to fix the indicator 111 for the corresponding display panels 200 to be turned on so that the error detection is continuously performed on the other display panels.

The first inputter 31 may be implemented as various input units. For example, the first inputter 31 may include a manipulation button for inputting a predetermined command (e.g., an operation starting command, an operation stopping command, or a target setting command), a keypad (e.g., a keyboard, a numeric pad, etc.) for inputting letters, numbers, and symbols, and a pointing device (e.g., a mouse, a trackball, a digitizer, a touch pad, etc.) for inputting coordinate values in a screen.

The first display portion 32 may display an image corresponding to a user input or an image representing operation information of a display system.

The first display portion 32 may provide a display screen image partitioned into a plurality of regions so as to distinguish positions of the display panels. The user may input the position detection command for the display panel 200 corresponding to a corresponding region by selecting one of the plurality of regions.

The first display portion 32 may be implemented as various display units such as a cathode ray tube display, a liquid crystal display, a light emitting diode panel, an organic light emitting diode panel, and the like. In some embodiments, the first display portion 32 may be implemented in the form of a touch screen panel (TSP) provided integrally with the first inputter 31. Hereinafter, an embodiment will be described by taking the case in which the first display portion 32 is implemented in the form of the TSP provided integrally with the first inputter 31 as an example.

The first communicator 34 is provided to exchange data with an external device including the display apparatus 10. For example, the first communicator 34 is provided to transmit the position detection command for at least one of the plurality of display panels, which is input from the user to the first inputter 31, or the error detection command for the plurality of display panels 200 to the communicator of the display apparatus 10. Further, the first communicator 34 is provided to receive error information of the display panel 200, which can be automatically detected by the display apparatus 10, from the display apparatus 10.

The first communicator 34 may include at least one of a wired communication module, a wireless communication module, and a short-range communication module according to the performance and structure of the user terminal 30, or may include a combination thereof.

The wired communication module may include various wired communication modules such as a local area network (LAN) module, a wide area network (WAN) module, a value-added network (VAN) module, and the like, and various cable communication modules such as a Universal Serial Bus (USB) module, a High-Definition Multimedia Interface (HDMI) module, a digital visual interface (DVI) module, a Recommended Standard 232 (RS-232), a power line communication module, a plain old telephone service (POTS) module, and the like.

The wireless communication module may include various wireless communication modules which support various wireless communication methods, such as a GSM module, a CDMA module, a W-CDMA module, a Universal Mobile Telecommunications System (UMTS) module, a time-division multiple access (TDMA) module, a Long-Term Evolution (LTE) module, and the like in addition to a WiFi module and a Wibro module.

The short-range communication module may include various short-range communication modules which transmit and receive signals using a wireless communication network in a short distance, such as a Bluetooth module, an infrared communication module, a radio-frequency identification (RFID) communication module, a wireless local access network (WLAN) communication module, a near-field communication (NFC) communication module, a Zigbee communication module, and the like.

The first memory 36 may be provided to store programs and data for controlling an operation of the user terminal 30 and may temporarily store data generated while the operation of the user terminal 30 is controlled.

The first memory 36 may be provided to store image data and programs for displaying a display screen image and various buttons on the first display portion 32 and may be provided to store graphic image data and programs for providing feedback with respect to the position detection command or the error detection command which is input by the user.

The first memory 36 may include a non-volatile memory, such as a read only memory (ROM), a flash memory, an erasable programmable read only memory (EPROM), an electrically erasable programmable read only memory (EEPROM), or the like for storing data for a long time, and a volatile memory, such as a static random access memory (SRAM), a dynamic random access memory (DRAM), or the like for temporarily storing data.

The first controller 38 functions to control an overall operation of the user terminal 30 and control a signal flow between internal components of the user terminal 30 and to process data.

The first controller 38 may execute a control program or an application stored in the first memory 36 of the user terminal 30 when a control command is input from the user or a predetermined condition is satisfied.

Specifically, when the user terminal 30 is connected to the display apparatus 10 and a position detection command for the display panel 200 or an error detection command for the plurality of display panels is input to the user terminal 30, the first controller 38 transmits the control command of the user to the display apparatus 10 through the first communicator 34. In addition, the display of the first display portion 32 may be controlled so that a screen corresponding to the control command of the user is provided.

Next, a configuration of the display apparatus 10, according to an embodiment, will be described. The display apparatus 10 is provided to be connectable to the user terminal 30 described above as necessary. More specifically, when the replacement of the display panel 200 is performed from the rear surface of the display apparatus 10, the display apparatus 10 may be connected to the user terminal 30 to perform the position detection of the target display panel 200 so that the operator may easily detect and separate the target display panel 200.

Meanwhile, when the replacement of the display panel 200 is performed from the front surface of the display apparatus 10, the display panel 200 may be configured to allow the operator to easily detect and separate the target display panel 200 by allowing the operator to perform the position detection of the target display panel 200 without the assistance of the user terminal 30 on the basis of the detection signal generated in the detection circuit 330 which will be described below.

Referring to FIG. 13, a display apparatus 10 may include an inputter 340, a display portion 350, a communicator 360, a memory 370, a detection circuit 330, a controller 380, and an indicator 111. Hereinafter, in order to distinguish the components of the user terminal 30 described above, the inputter 340, the display portion 350, the communicator 360, the memory 370, and the controller 380 of the display apparatus 10 are referred to as a second inputter 340, a second display portion 350, a second communicator 360, a second memory 370, and a second controller 380, respectively.

The second inputter 340 may receive a user input from the user and output an electrical signal corresponding to the received user input to the second controller 380. Specifically, the second inputter 340 may receive the control command for the display apparatus 10 from the user and may receive, for example, an operation command or a mode setting command for the display apparatus 10 and output an electrical signal corresponding to the user input to the second controller 380.

The second inputter 340 may be implemented as various input units. Hereinafter, a description identical to that of the first inputter 31 described above will be omitted.

The second display portion 350 may display an image corresponding to a user input or an image representing operation information of a display system.

The second display portion 350 may display an image as a whole through the plurality of display panels 200 provided in each of the display modules.

The display panel 200 may generate an image according to image data received from a display drive 352 and display the image.

Generally, the display panel 200 may provide a single image with a plurality of display panels as a single unit, and the target display panel 200 may provide a preset image when the detection of the display panel 200 is performed. Here, the preset image may be variously provided according to the intention of the designer, and may be provided on, for example, a screen for displaying a boundary of the display panel 200 or a full screen that fills the display panel 200. The user may identify a boundary with other display panels connected to a periphery of the target display panel 200 using the image displayed on the target display panel 200 or identify whether the display panel 200 is defective or not.

The display panel 200 may include pixels serving as a unit for displaying an image. Each of the pixels may receive each of electrical signals representing the image from the display drive 352 and output an optical signal corresponding to the received electrical signal. The image may be displayed on one display panel 200 by combining the optical signals which are output by the plurality of pixels as described above.

The display panel 200 may be provided as an LED panel, an OLED panel, or the like as described above.

The display drive 352 may receive image data from the second controller 380 and drive the plurality of display panels so as to display an image corresponding to the received image data. Specifically, the display drive 352 may transmit electrical signals each corresponding to the image data to each of the plurality of pixels constituting the display panel 200 with respect to the plurality of display panels.

When the display drive 352 transmits the electrical signals each corresponding to the image data to each of the pixels constituting the display panel 200, each of the pixels outputs light corresponding to the received electrical signal, and one image may be formed by combining the light output by the pixels.

The second communicator 360 is provided to exchange data with an external device including the user terminal 30. For example, the second communicator 360 receives an electrical signal for a position detection command for at least one of the plurality of display panels or an error detection command for the plurality of display panels 200 from the user terminal 30 and transmits the received signal to the second controller 380. In some embodiments, the second communicator 360 receives the electrical signal for the position detection command for at least one of the plurality of display panels or the error detection command for the plurality of display panels 200 from other adjacent display apparatuses constituting the same video wall and transmits the received signal to the second controller 380.

The second communicator 360 is provided to simultaneously or sequentially receive the position detection command for at least one of the plurality of display panels from the user terminal 30.

The second communicator 360 may include at least one of a wired communication module, a wireless communication module, and a short-distance communication module according to the performance and structure of the display apparatus 10, or may include a combination thereof. Hereinafter, a description identical to that of the first communicator 34 described above will be omitted.

The second memory 370 may be provided to store a program or an application for controlling an operation of the display apparatus 10 and to store data generated while the operation of the display apparatus 10 is controlled.

More specifically, when a position detection command for a specific display panel 200 is transmitted from the user terminal 30 to the display apparatus 10, the second memory 370 may be provided to detect a position of a target display panel 200 and provide a preset image to the target display panel 200 and may be provided to store a control program, an application, or data provided to turn on an indicator 111 corresponding to the target display panel 200.

Further, when the error detection command for the display panels is transmitted from the user terminal 30 to the display apparatus 10, the second memory 370 may be provided to detect an error for the plurality of display panels and turn on the indicator 111 corresponding to the display panel 200 in which the error is detected, or in some cases, the second memory 370 may be provided to store a control program, an application, or data provided to provide a preset image to the display panel 200 in which the error is detected.

Further, the second memory 370 may be provided to store a control program, an application, or data provided to provide a preset image to the display panel 200 corresponding to the detection circuit 330 which transmits a signal on the basis of the detection signal transmitted from the detection circuit 330.

A description of a type of the second memory 370, which is identical to that of the first memory 36 described above, will be omitted.

The detection circuit 330 is a component required for the replacement of the display panel 200 from the front surface of the display apparatus 10, as described above, and the detection signal generated in the detection circuit 330 is transmitted to the second controller 380. Hereinafter, description of a principle that the detection signal is generated in the detection circuit 330, which is identical to that described above, will be omitted.

The second controller 380 functions to control an overall operation of the display apparatus 10 and a signal flow between internal components of the display apparatus 10 and process data.

The second controller 380 may include a processor, a ROM used for storing a control program for controlling the display apparatus 10, and a random access memory (RAM) used for storing signals or data input from the outside of the display apparatus 10 or used as a storage region corresponding to various operations performed in the display apparatus 10.

The processor may include a graphics processor for graphics processing of the image or video provided to the display panel 200 of the display apparatus 10 and may perform the function of the image reproducing device 20 described above.

The second controller 380 may execute a control program or an application stored in the second memory 370 of the display apparatus 10 when a control command is input from the user or a preset condition is satisfied.

Particularly, the second controller 380 may control to display the preset image on the display panel 200 which becomes a position detection target among the plurality of display panels or to turn on the indicator 111 corresponding to the display panel 200 which becomes the position detection target on the basis of the position detection command for the display panel 200 received from the second communicator 360.

Further, the second controller 380 may control to detect the error for the plurality of display panels and to turn on the indicator 111 corresponding to the display panel 200 in which the error is detected on the basis of the error detection command for the display panel received from the communicator. In some embodiments, the second controller 380 may control to display the preset image on the display panels 200 in which the error is detected.

Further, the second controller 380 may control the display panel 200 which becomes a detection target corresponding to the detection circuit 330 to display the preset image on the basis of the detection signal generated in the detection circuit 330. In some embodiments, in the case in which the plurality of detection circuits 330 are connected in series with respect to the target display panel 200, when a detection signal is generated in any one of the plurality of detection circuits 330, the second controller 380 may control the target display panel 200 to display the preset image on the basis of the corresponding detection signal.

As described above, the specific control configuration of the display apparatus 10 according to an embodiment has been described.

Next, an operation principle and a control method of the display apparatus 10, according to an embodiment, will be described in detail with reference to the following drawings on the assumption of the display apparatus 10 described above.

The display apparatus 10 according to an embodiment may be provided such that the position detection and replacement of the display panel 200 are performed from the front or rear surface of the apparatus as described above. Therefore, the operation principle and the control method of the display apparatus 10 will be described by dividing the case in which the position detection and replacement is performed from the front surface of the apparatus and the case in which the position detection and replacement is performed from the rear surface of the apparatus.

First, the case in which the position detection and replacement are performed from the rear surface of the display apparatus 10 will be described.

Figure 14:
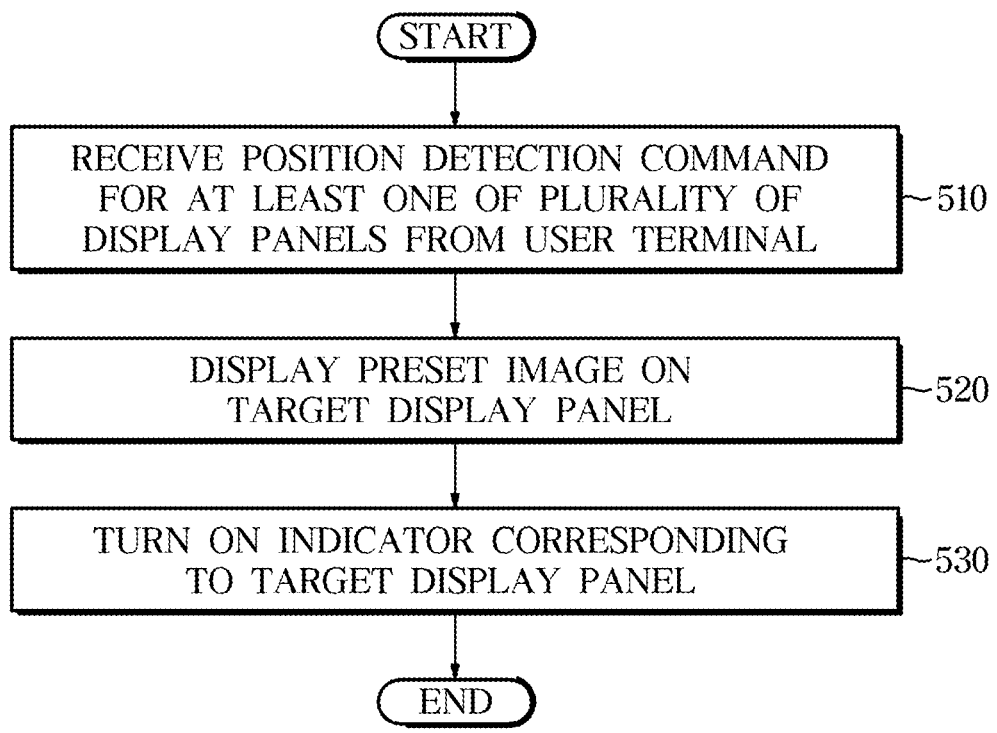
FIG. 14 is a flowchart illustrating a control method of a display apparatus according to an embodiment.
Figure 15:
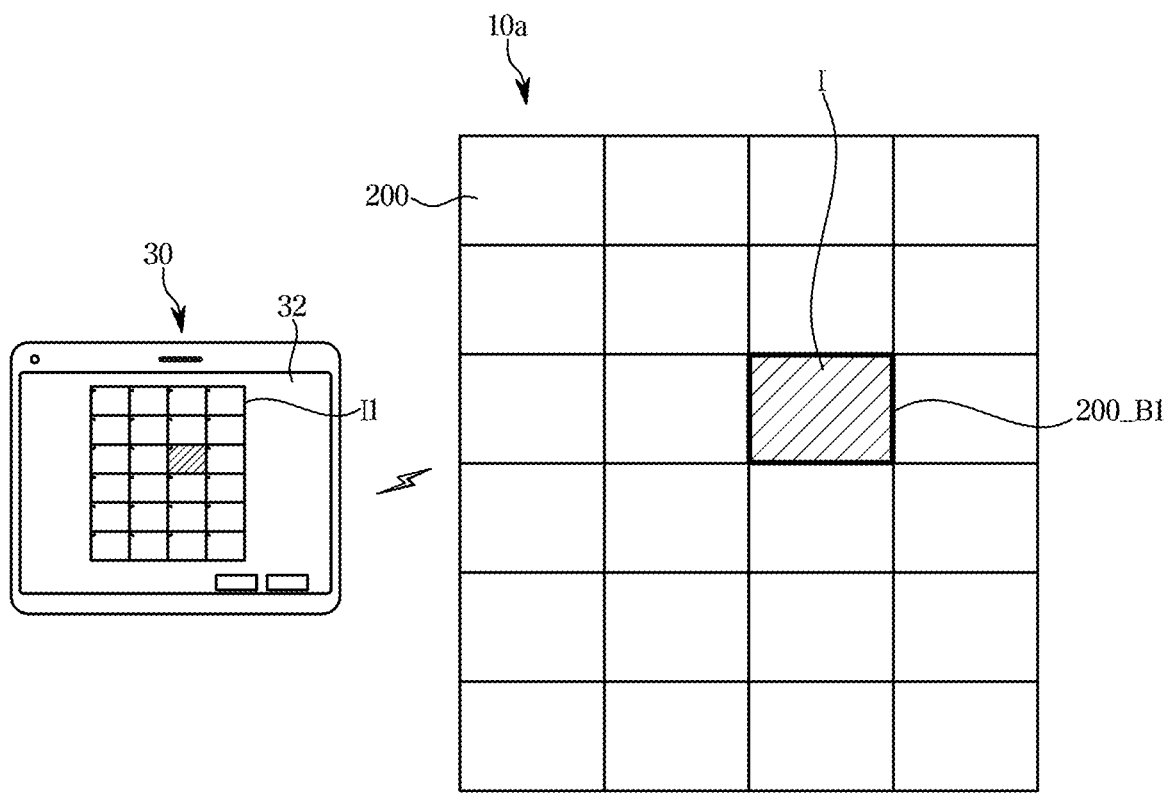
FIG. 15 is a view illustrating a state in which replacement of a display panel is performed from a rear surface of a display apparatus according to an embodiment.
Figure 16:
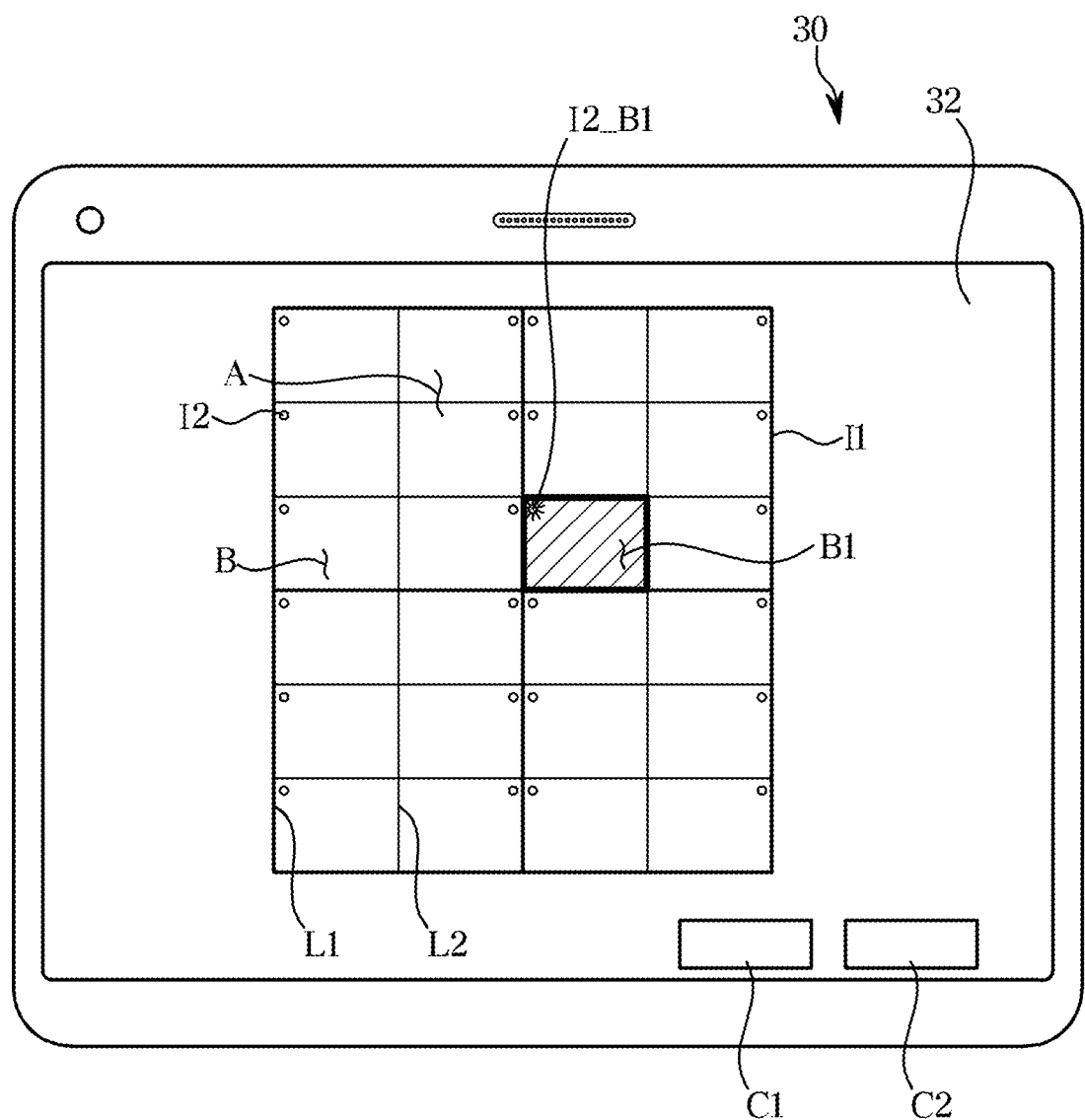
FIG. 16 is a view illustrating a user interface screen provided to a user terminal according to an embodiment.
Figure 17:
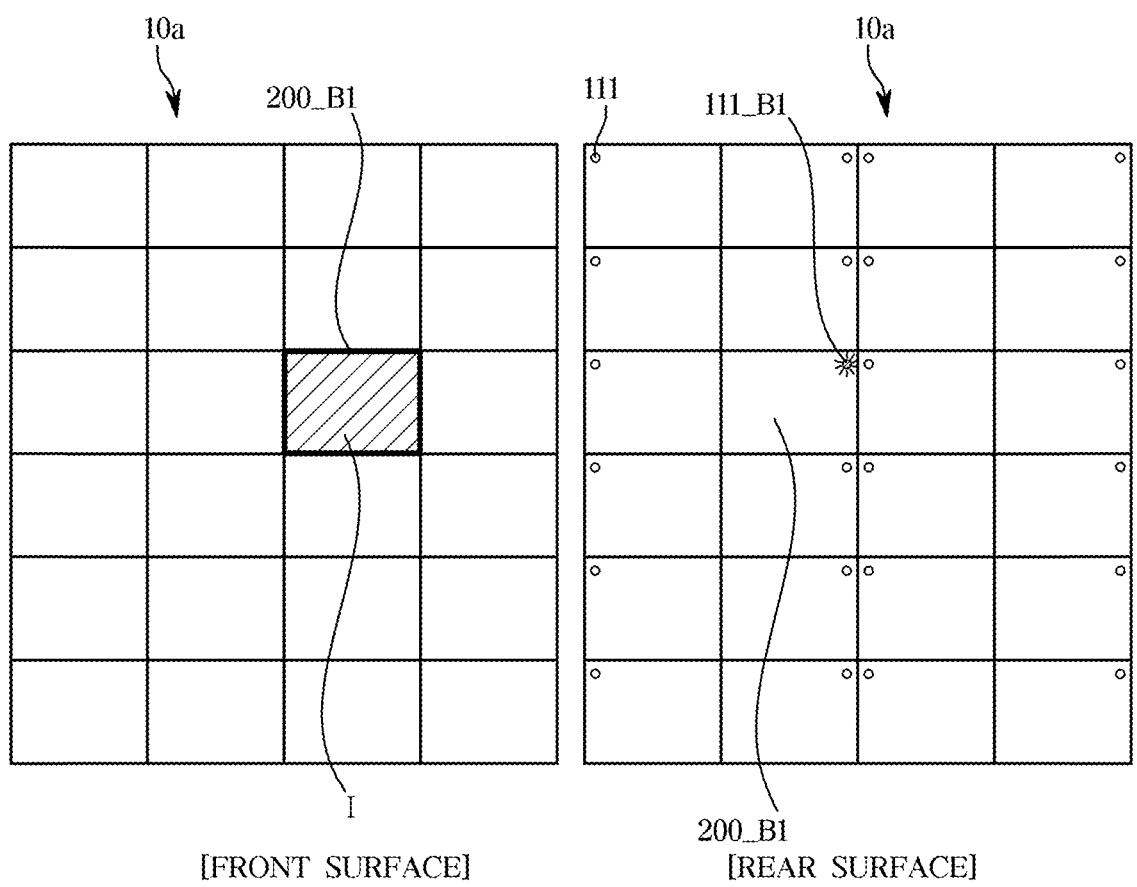
FIG. 17 is a view illustrating a state in which a display apparatus is controlled by a user input which is input to a user terminal according to an embodiment.

FIG. 14 is a flowchart illustrating a control method of a display apparatus according to an embodiment, FIG. 15 is a view illustrating a state in which the replacement of the display panel 200 is performed from the rear surface of the display apparatus according to an embodiment, FIG. 16 is a view illustrating a user interface screen provided to the user terminal 30 according to an embodiment, and FIG. 17 is a view illustrating a state in which the display apparatus 10 is controlled by a user input which is input to the user terminal 30 according to an embodiment.

FIGS. 15 to 17 show an example in which a display apparatus 10a is composed of four display modules, each provided with six display panels for convenience of description. Hereinafter, an embodiment will be described on the assumption of the display apparatus 10a provided as described above.

Referring to FIGS. 14 and 15, the control method of the display apparatus 10a according to an embodiment includes receiving a position detection command for at least one of a plurality of display panels from the user terminal 30 (in operation 510), displaying a preset image I on a target display panel 200_B1 (in operation 520), and turning on an indicator 111_B1 corresponding to the target display panel 200_B1 (in operation 530).

First, the receiving of the position detection command for at least one of the plurality of display panels from the user terminal 30 is performed by a second communicator 360 of the display apparatus 10a. More specifically, when the position detection command for at least one of the plurality of display panels is received through the user terminal 30, an electrical signal for the position detection command is transmitted to the display apparatus 10a through the first communicator 34 and the second communicator 360.

The user terminal 30 may provide a display screen image I1 so as to receive the position detection command for at least one of the plurality of display panels from the user. More specifically, the first display portion 32 of the user terminal 30 may provide the display screen image I1 partitioned into a plurality of regions so as to distinguish positions of the plurality of display panels.

Hereinafter, an example of the display screen image I1 provided by the user terminal 30, according to an embodiment, will be described in order to facilitate understanding.

Referring to FIG. 16, the first display portion 32 of the user terminal 30 may provide a user interface screen provided with the display screen image I1 and various types of button icons C1 and C2.

The display screen image I1 may be partitioned into a plurality of regions by dividing lines so that a display module 100 and a display panel 200 may be distinguished from each other. For example, the display screen image I1 may distinguish a display module region A by a preset first dividing line L1 and distinguish a display panel region B by a preset second dividing line L2.

A preset graphic image I2 may be provided in the regions A and B partitioned by the first and second dividing lines L1 and L2 of the display screen image I1. Here, the graphic image may include a graphic image for the indicator 111.

The button icon C1 may be provided at a lower end of the display screen image I1 to receive an automatic error detection command for the plurality of display panels. In some embodiments, the button icon C2 may be provided at a lower end of the display screen image I1 to receive a determination command for determining the selected display panel 200 to be a target display panel 200.

The user may input the position detection command for the display panel 200 corresponding to the corresponding region by selecting a specific one of the partitioned regions of the display screen image. For example, the position detection command for the specific display panel 200 may be input from the user by selecting a specific display panel region B1 of the plurality of display panels 200.

When the position detection command for the specific region is input from the user, a region selected by the user may be displayed separately from the other regions. For example, when the region B1 is selected by the user, a color of the region B1 may be changed and displayed, and an indicator image I2_B1 may be turned on, as shown in FIG. 16. In some embodiments, a dividing line for distinguishing the region B1 may be changed and displayed or the region B1 may be enlarged and displayed.

When the second controller 380 of the display apparatus 10a receives the position detection command from the user terminal 30, the second controller 380 of the display apparatus 10a may detect the target display panel 200 on the basis of the position detection command, display the preset image on the target display panel 200, and turn on the indicator 111 corresponding to the target display panel 200.

The displaying of the preset image on the target display panel 200 and the turning on of the indicator 111 corresponding to the target display panel 200 may be performed in any order. In some embodiments, the above two processes may be simultaneously performed.

Referring to FIG. 17, when the display apparatus 10a receives the position detection command for the display panel 200 corresponding to the region B1 from the user terminal 30, the display apparatus 10a may display the preset image I on the display panel 200_B1 corresponding to the region B1 and turn the indicator 111_B1 corresponding to the region B1 to on.

The operator may easily find the target display panel 200_B1 through the indicator 111_B1 to be turned-on on the rear surface of the display apparatus 10a when the separation of the display panel 200 is performed, and thus the separation of the display panel 200 may be performed efficiently.

In FIGS. 14 to 17, an example in which the displaying of the preset image I on the target display panel 200_B1 and the turning of the indicator 111_B1 corresponding to the target display panel 200_B1 on are performed sequentially is described, but the present disclosure is not limited thereto. In other words, the displaying of the preset image on the target display panel and the turning on of the indicator corresponding to the target display panel 200_B1 may be independently performed. In some embodiments, the above processes may be simultaneously performed.

Figure 18:
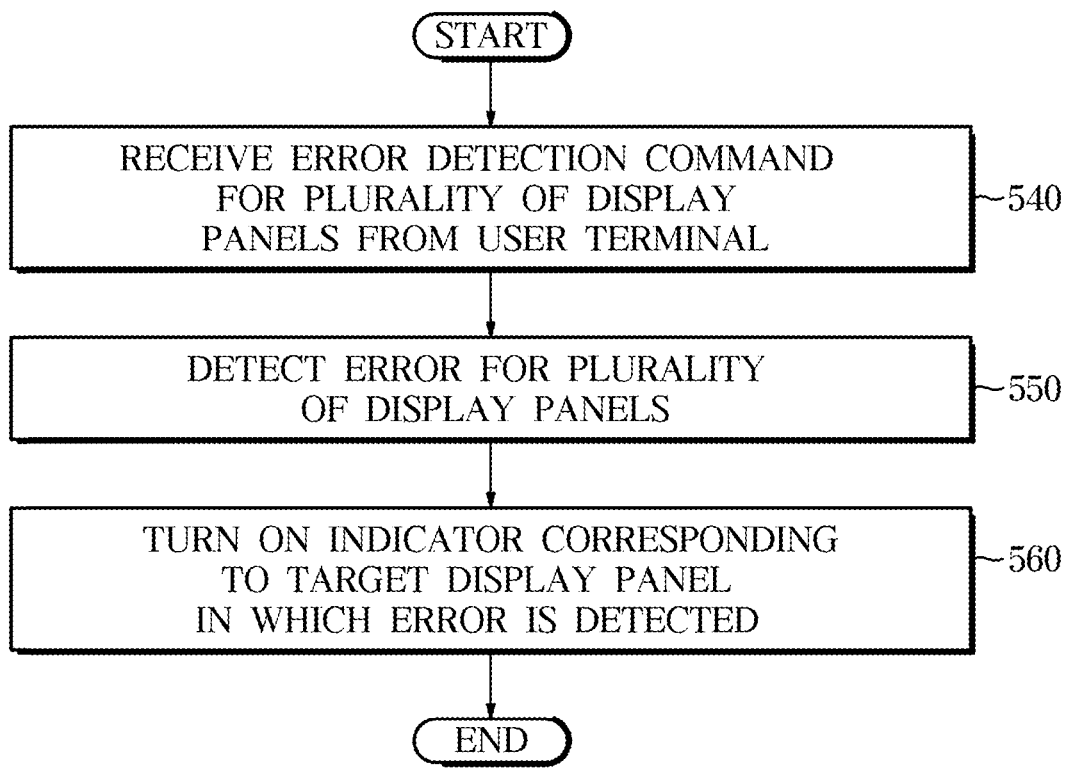
FIG. 18 is a flowchart illustrating a control method of a display apparatus according to another embodiment.

FIG. 18 is a flowchart illustrating a control method of a display apparatus 10a according to another embodiment.

Referring to FIG. 18, the control method of the display apparatus 10a according to another embodiment includes receiving an error detection command for a plurality of display panels from the user terminal 30 (in operation 540), detecting an error for the plurality of display panels (in operation 550), and turning on an indicator 111 corresponding to a display panel 200 in which the error is detected (in operation 560).

First, the receiving of the error detection command for the plurality of display panels from the user terminal 30 is performed. When an execution command for the automatic error detection button icon C1 of the user terminal 30 is input by the user, the user terminal 30 transmits an automatic error detection command signal to the display apparatus 10a.

Next, the second controller 380 performs the detecting of the automatic error for the plurality of display panels on the basis of the error detection command signal received from the user terminal 30. The display apparatus 10a may detect an error generated in the display panel 200 itself by performing the present process.

Next, the second controller 380 turns on the indicator 111 corresponding to the display panel 200 in which the error is detected. According to an embodiment, the display apparatus 10a may detect self-detectable errors at once. In addition, although not shown in FIG. 18, the processes 510, 520, and 530 described in FIG. 14 may be continued after the processes 540, 550, and 560, and thus the error detection and the replacement of the display panels 200 may be more effectively performed.

Next, the case in which the replacement is performed from the front surface of the display apparatus 10a, according to an embodiment, will be described.

Figure 19:
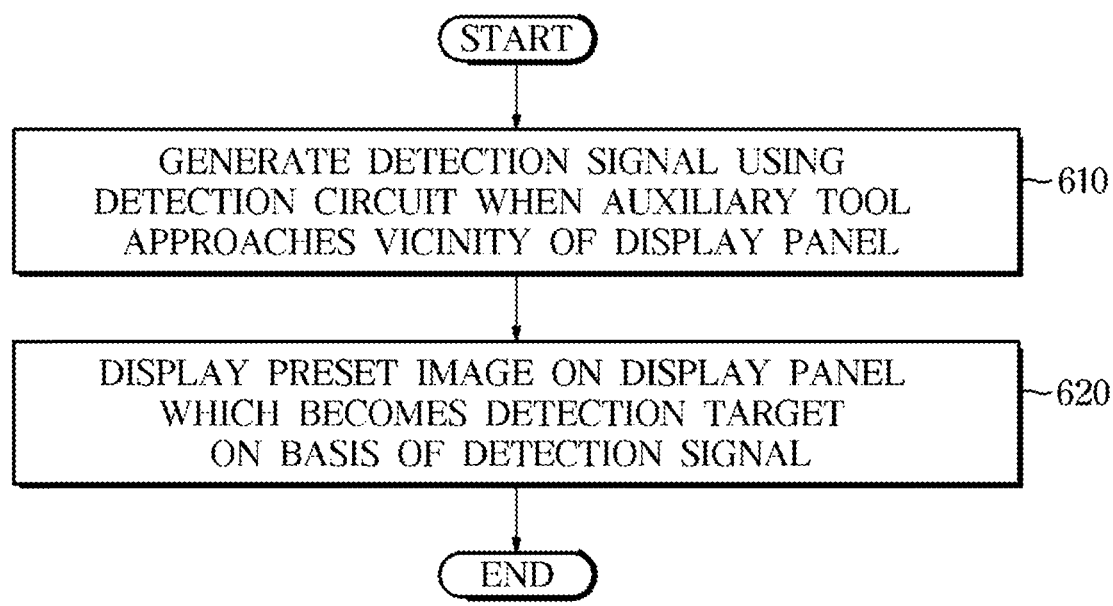
FIG. 19 is a flowchart illustrating a control method of a display apparatus according to an embodiment.
Figure 20:
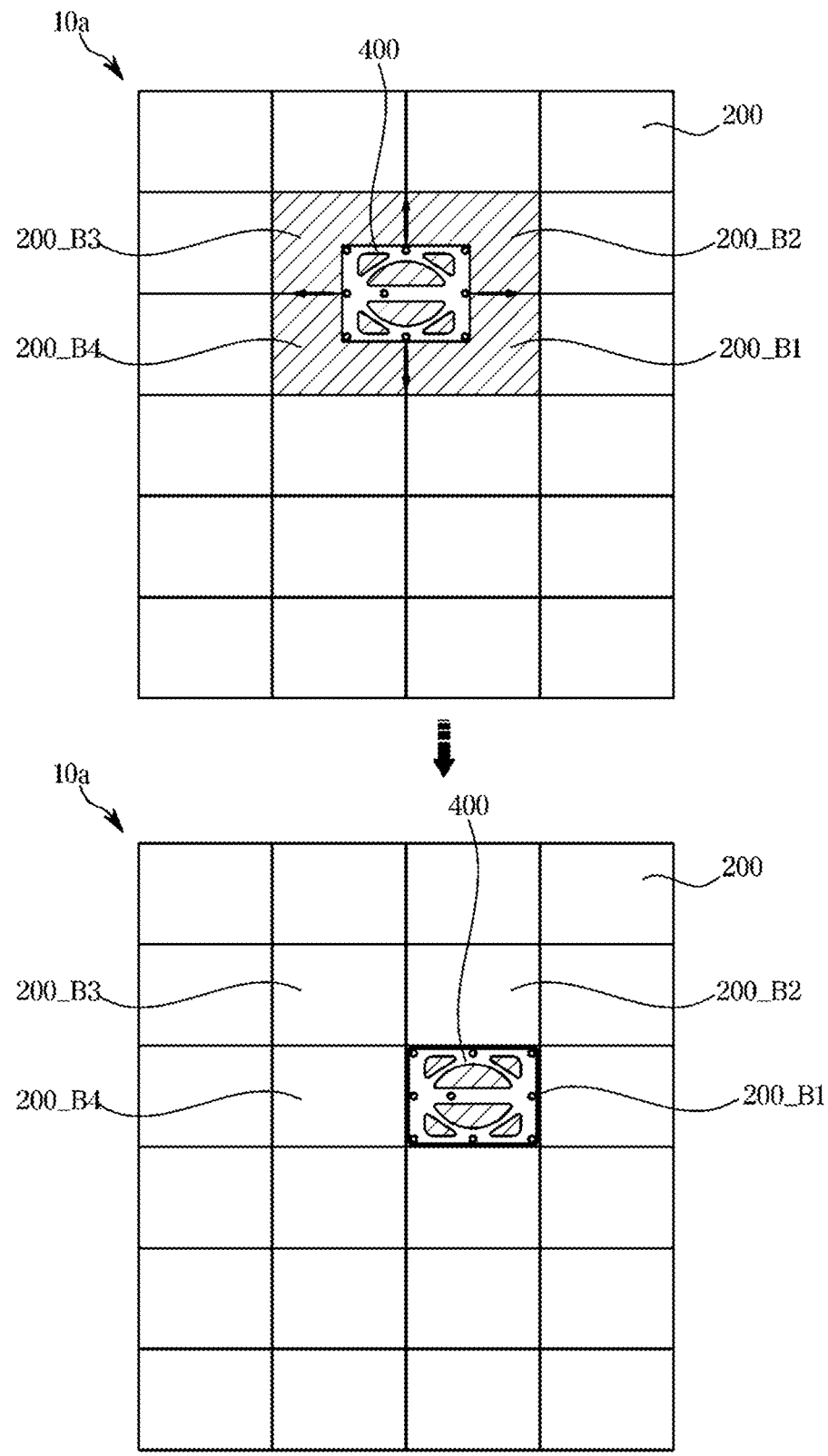
FIG. 20 is a view illustrating a state in which replacement of a display panel is performed from a front surface of a display apparatus according to an embodiment.

FIG. 19 is a flowchart illustrating a control method of the display apparatus 10a according to an embodiment, and FIG. 20 is a view illustrating a state in which the replacement of the display panel 200 is performed from the front surface of the display apparatus 10a.

Referring to FIG. 19, the control method of the display apparatus 10a according to an embodiment includes generating, by the detection circuit 330, a detection signal when the auxiliary tool 400 approaches the vicinity of the display panel 200 (in operation 610) and displaying a preset image on the display panel 200 which becomes a detection target on the basis of the generated detection signal (in operation 620).

First, when the auxiliary tool 400 approaches the vicinity of the display panel 200, the detection signal is generated in the detection circuit 330. More specifically, the operator allows the auxiliary tool 400 to approach the vicinity of the display panel 200 of the display apparatus 10a which becomes an operation target. The auxiliary tool 400 includes a magnet as described above according to an embodiment. When the auxiliary tool 400 approaches the vicinity of the display panels 200, a change in magnetic flux occurs around the detection circuit 330 described above. The detection circuit 330 generates a detection signal due to an electromotive force generated by the change in magnetic flux around the detection circuit 330 and transmits the generated detection signal to the second controller 380.

Next, the second controller 380 displays the preset image on the display panel 200 which becomes the detection target on the basis of the detection signal received from the detection circuit 330. More specifically, the second controller 380 may display the preset image on the display panel 200 corresponding to the detection circuit 330 which transmits the detection signal.

Referring to FIG. 20, when the auxiliary tool 400 approaches the vicinity of the display panel 200, a preset image I is displayed on the display panel 200 facing the auxiliary tool 400. For example, when the auxiliary tool 400 approaches the vicinity of display panels 200_B1, 200_B2, 200_B3, and 200_B4, the preset image I is displayed on the display panels 200_B1, 200_B2, 200_B3, and 200_B4 facing the auxiliary tool 400.

The auxiliary tool 400 may be moved, by the user's operation, in a first direction X or a second direction Y while facing the display panel 200. When the auxiliary tool 400 is moved to face the display panel 200_B1 due to the movement of the auxiliary tool 400, the image I displayed on the display panels 200_B2, 200_B3, and 200_B4 disappears and the image I displayed on the display panel 200_B1 is maintained.

The operator may identify the positions and the boundary of the display panels with reference to the image provided on the display panel 200 due to the auxiliary tool 400 being moved on the front surface of the display apparatus in the first direction X or the second direction Y as described above. The operator may determine whether the preset image is provided on the display panel 200 to determine whether the display panel 200 is defective or not. In addition, when the image provided on the display panels 200 is different from the preset image, it may be determined that the corresponding display panel 200 is a display panel 200 to be replaced.

According to a display apparatus and a control method thereof according to an aspect of the present disclosure, a display panel which becomes an operation target can be easily identified using an indicator provided in the display apparatus, and thus the replacement and separation of the display panel can be performed efficiently.

According to a display apparatus and a control method thereof according to another aspect of the present disclosure, a detection circuit can be formed at a portion at which a display panel is provided so that a display panel which becomes an operation target can be easily identified, and thus the replacement and separation of the display panel can be efficiently performed.

As a result, a cost saving effect can be obtained by reducing labor costs and shortening construction time, and damage of the display module caused by the replacement and separation of the display module can be reduced.

The embodiments of the display apparatus and the control method thereof have been described. The technological scope of the present disclosure is not limited by the above-described embodiments, and it should be understood by those of ordinary skill in the art that various changes in form and details may be made therein without departing from the sprit and scope of the present disclosure as defined by the following claims.

What is claimed is:

1. A display apparatus comprising:
   a cabinet;
   a plurality of display panels disposed at a first side of the cabinet;
   a plurality of indicators disposed at a second side opposite to the first side;
   a communicator configured to receive an external signal for detecting positions of the plurality of display panels; and
   a controller configured to control an indicator among the plurality of indicators disposed at the second side to be turned on based on the external signal received by the communicator, the indicator corresponding to a display panel from among the plurality of display panels, the display panel being a position detection target.

2. The display apparatus according to claim 1, wherein the controller controls the display panel to display a preset image based on the external signal received by the communicator.

3. The display apparatus according to claim 1, wherein the plurality of indicators are disposed in the cabinet and correspond to rear surfaces of the plurality of display panels to identify the positions of the plurality of display panels.

4. The display apparatus according to claim 1, wherein the indicator is on a control board mounted on the cabinet.

5. The display apparatus according to claim 1, wherein:
   the communicator receives, from a user terminal, a position detection command for at least one of the plurality of display panels; and
   the user terminal provides a display screen image partitioned into a plurality of regions corresponding to installation positions of the plurality of display panels.

6. The display apparatus according to claim 5, wherein the communicator is further configured to receive, from the user terminal, the position detection command for the display panel corresponding to at least one of the plurality of regions.

7. The display apparatus according to claim 1, wherein the communicator is further configured to simultaneously or sequentially receive an external signal for detecting the positions of the plurality of display panels.

8. The display apparatus according to claim 1, wherein the communicator is a digital signal input port which receives the external signal from another adjacent display apparatus.

9. The display apparatus according to claim 1, wherein:
   the communicator receives another external signal for determining at least one of the plurality of display panels; and
   the controller controls the indicator to remain turned-on based on the external signal received by the communicator.

10. The display apparatus according to claim 1, wherein:
    the communicator receives another external signal for detecting an error for at least one display panel from among the plurality of display panels; and
    the controller detects the error for the at least one display panel based on the another external signal and controls the indicator corresponding to the at least one display panel in which the error is detected to be turned on.

11. The display apparatus according to claim 1, further comprising:
    a coupling device to mount the display panel to be detachable from the cabinet.

12. The display apparatus according to claim 11, further comprising a detection circuit formed around the coupling device,
    wherein the controller controls the display panel to display a preset image based on the detection signal generated in the detection circuit.

13. The display apparatus according to claim 12, wherein:
    the coupling device comprises a first coupling member mounted on the display panel and a second coupling member mounted on the cabinet;
    the first coupling member and the second coupling member are to be locked or released from each other by a magnetic force; and
    the detection circuit is a pattern formed in a shape of a winding around the first coupling member.

14. The display apparatus according to claim 12, wherein:
    the coupling device comprises a plurality of coupling devices with respect to a single display panel from among the plurality of display panels; and
    a plurality of the detection circuits respectively formed around the coupling devices are connected in series.

15. The display apparatus according to claim 12, wherein, when an auxiliary tool, which has a first size and a first shape corresponding to a second size and a second shape of the display panel and which comprises a magnet at a first position corresponding to a second position of the coupling device, approaches a vicinity of the detection circuit, a detection signal is generated from the detection circuit based on a change in a magnetic flux in the vicinity of the detection circuit.

16. A control method of controlling a display apparatus which comprises a cabinet, a plurality of display panels disposed at a first side of the cabinet, a plurality of indicators disposed at a second side opposite to the first side, and a communicator configured to receive an external signal for detecting positions of the plurality of display panels, the control method comprising:

receiving, by the communicator, the external signal for detecting the positions of the plurality of display panels; and turning on an indicator among the plurality of indicators disposed at the second side, the indicator corresponding to a display panel from among the plurality of display panels, the display panel being position detection target.

17. The control method according to claim 16, further comprising displaying a preset image on the display panel.

18. The control method according to claim 16, wherein the receiving of the external signal comprises receiving, from a user terminal by the communicator, a position detection command for at least one of the plurality of display panels.

19. The control method according to claim 18, wherein:
the user terminal provides a display screen image partitioned into a plurality of regions corresponding to installation positions of the plurality of display panels; and the communicator receives from the user terminal the position detection command for the display panel corresponding to the at least one of the plurality of regions.

20. The control method according to claim 16, wherein the receiving of the external signal comprises simultaneously or sequentially receiving, by the communicator, the external signal for detecting the positions of the plurality of display panels.

* * * * *